United States Patent
Cao et al.

(10) Patent No.: US 11,146,363 B2
(45) Date of Patent: Oct. 12, 2021

(54) SYSTEMS AND METHODS FOR HARQ RETRANSMISSION USING AN OUTER CODE

(71) Applicants: Yu Cao, Kanata (CA); Ming Jia, Ottawa (CA)

(72) Inventors: Yu Cao, Kanata (CA); Ming Jia, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 16/377,704

(22) Filed: Apr. 8, 2019

(65) Prior Publication Data

US 2019/0319749 A1   Oct. 17, 2019

Related U.S. Application Data

(60) Provisional application No. 62/657,611, filed on Apr. 13, 2018.

(51) Int. Cl.
*H04L 1/18* (2006.01)
*H04L 1/00* (2006.01)

(52) U.S. Cl.
CPC .......... *H04L 1/1812* (2013.01); *H04L 1/0063* (2013.01); *H04L 1/1864* (2013.01)

(58) Field of Classification Search
CPC ... H04L 1/1812; H04L 1/0063; H04L 1/1864; H04L 1/189; H04L 1/1819; H04L 1/005; H04L 1/0061; H04L 1/0064; H04L 1/0041; H04L 1/0057

USPC ........................................................ 714/748
See application file for complete search history.

(56) References Cited

U.S. PATENT DOCUMENTS

| | | | |
|---|---|---|---|
| 8,234,551 B2 | 7/2012 | Shen et al. | |
| 9,391,640 B2 | 7/2016 | Murakami | |
| 2005/0022097 A1* | 1/2005 | Cheng | H04L 1/1816 714/774 |

(Continued)

FOREIGN PATENT DOCUMENTS

| CN | 101562495 A | 10/2009 |
|---|---|---|
| CN | 101605019 A | 12/2009 |

(Continued)

OTHER PUBLICATIONS

3GPP document R1-1608976, "Consideration on Outer Codes for NR", 3GPP TSG-RAN WG1 #86bis, Lisbon, Portugal, published Oct. 10, 2016.

(Continued)

*Primary Examiner* — James C Kerveros

(57) ABSTRACT

Systems and methods disclosed herein provide an outer code for HARQ applications, which may be an erasure code. In some embodiments, the outer code has a relatively simple decoding algorithm, increased decoding probability with no extra redundancy packets needed and can correct an arbitrary number of code blocks. In some embodiments, the outer code may be implemented as part of the 5G air interface, also known as new radio (NR), and/or in applications such as vehicle-to-everything (V2X) and/or ultra-reliable low latency communication (URLLC). Some embodiments provide a nested HARQ protocol for HARQ transmission with an outer code.

24 Claims, 18 Drawing Sheets

(56) References Cited

U.S. PATENT DOCUMENTS

| | | | |
|---|---|---|---|
| 2005/0117557 A1* | 6/2005 | Lakkis | H04B 1/71635 370/338 |
| 2007/0124652 A1 | 5/2007 | Litsyn et al. | |
| 2009/0158112 A1* | 6/2009 | Oh | H03M 13/611 714/752 |
| 2011/0276851 A1* | 11/2011 | Nagaraja | H04L 1/1829 714/748 |
| 2013/0294367 A1* | 11/2013 | Jalloul | H04W 72/082 370/329 |
| 2014/0068388 A1 | 3/2014 | Carpio et al. | |
| 2016/0043831 A1 | 2/2016 | Seo et al. | |
| 2016/0285589 A1* | 9/2016 | Mukkavilli | H04L 1/0045 |
| 2017/0222754 A1 | 8/2017 | Noh et al. | |
| 2017/0250844 A1 | 8/2017 | Wu et al. | |
| 2017/0279464 A1* | 9/2017 | Noh | H03M 13/116 |
| 2017/0294990 A1 | 10/2017 | Xu et al. | |
| 2018/0109355 A1* | 4/2018 | Werner | H04L 1/1854 |
| 2018/0159660 A1 | 6/2018 | Jia et al. | |
| 2019/0229751 A1* | 7/2019 | Kim | H04L 1/1819 |

FOREIGN PATENT DOCUMENTS

| | | |
|---|---|---|
| CN | 102334379 B | 1/2014 |
| CN | 107294652 A | 10/2017 |
| WO | 2016045391 A1 | 3/2016 |
| WO | 2018031777 A1 | 2/2018 |

OTHER PUBLICATIONS

3GPP document R1-1610143, "Erasure coding and HARQ design", 3GPP TSG-RAN WG1 #86bis, Lisbon, Portugal, published Oct. 10, 2016.

3GPP document R1-166375, "Erasure coding evaluation methodology", 3GPP TSG-RAN WG1 #86, Gothenburg, Sweden, published Aug. 22, 2016.

Qualcomm Incorporated, Outer Code Design for URLLC and eMBB Multiplexing. 3GPP TSG-RAN WG1 #88, Feb. 13,17, 2017, Athens, Greece, R1-1702641, 10 pages.

* cited by examiner

SYSTEMS AND METHODS FOR HARQ RETRANSMISSION USING AN OUTER CODE

PRIORITY

The present application claims the benefit under 35 U.S.C § 119(e) of U.S. Provisional Patent Application Ser. No. 62/657,611, entitled "Systems and Methods for HARQ Retransmission Using an Outer Code", which was filed on Apr. 13, 2018, and which is incorporated herein by reference.

FIELD

The present application relates to wireless communication, and more particularly to outer coding for hybrid automatic repeat request (HARQ).

BACKGROUND

In some wireless communication systems, user equipments (UEs) wirelessly communicate with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a base station may wirelessly transmit data, such as a transport block (TB), to a UE in a downlink transmission at a particular frequency and over a particular duration of time. The frequency and time duration used are examples of resources.

Channel coding, such as forward error-correction coding or error-correction coding, introduces redundancy into the data prior to transmission. The receiving system exploits the redundancy to detect and possibly correct errors introduced during transmission, e.g. errors introduced by the channel, the receiver, the transmitter, a storage medium, etc. For example, in a communication system that employs forward error-correction coding, a source provides data to an encoder, which is also referred to as a coder. The encoder encodes the data to generate a longer sequence of coded bits. The coded bits include redundancy, which may be in the form of parity bits. The coded bits are called a codeword. Codewords are transmitted to a receiver. The receiver uses a suitable decoder to try to extract the original unencoded data. The decoder may also correct errors, which may have been caused during transmission of the codeword, e.g. because of a noisy channel.

Channel coding can thus be used to detect and/or correct errors, which may reduce the need for the transmitter to retransmit data that was corrupted during transmission. By reducing the need to retransmit data, the throughput of the channel or link may be improved.

In some systems, a TB is divided into several forward error correction (FEC) blocks, and the FEC blocks are scheduled for transmission by a scheduler. However, if a TB transmission fails, e.g. if the decoder does not pass a cyclic redundancy check (CRC) check, then the redundant versions of all of the FEC blocks in the TB are retransmitted, even though some of the FEC blocks may have been correctly received. That is, HARQ retransmission is TB based. The retransmission may use the same or a different redundancy version (RV) of the TB. Soft combining of the different transmissions of the TB is used. To manage complexity, each UE may have a limited number of HARQ processes, e.g. eight HARQ processes.

In some systems, code block group (CBG) based retransmission is supported. A CBG refers to a group of code blocks (CBs). A possible benefit of CBG based retransmission compared to TB based retransmission is that in CBG based retransmission one or multiple CBGs may be retransmitted instead of the whole TB. Soft combining of different transmissions of a CBG may be performed. However, for CBG based retransmission, the UE needs to feedback a CBG index that indicates which CBGs failed. The CBG index increases the overhead of the HARQ feedback.

Furthermore, depending upon the application, soft combining based HARQ may not work well. As one example, some systems support multiplexing of different traffic types, including pre-empting scheduled enhanced mobile broadband (eMBB) traffic when more urgent ultra-reliable low latency communications (URLLC) traffic arrives for transmission. The FEC block or CBG corresponding to the pre-empted traffic may not be known to the decoder, in which case the receiver may attempt to soft-combine a transmission containing different information intended for a different receiver. As a result, HARQ combining based on soft combining may not work or may have worse performance than not performing soft combining on the pre-empted traffic.

It is desired to improve the communication technology by addressing at least one of the disadvantages outlined above.

SUMMARY

Systems and methods disclosed herein provide an outer code for HARQ applications. Since the outer code is mainly used for an erasure channel, the outer code is sometimes referred to as an outer erasure code. This does not preclude the use of the outer code for other type of channels, such as error channels or noisy channels. In some embodiments, the outer code has a relatively simple decoding algorithm, increased decoding probability with no extra redundancy packets needed and can correct an arbitrary number of code blocks. In some embodiments, the outer code may be implemented as part of the Third Generation Partnership Project (3GPP) fifth generation (5G) air interface, also known as new radio (NR), and/or in applications such as vehicle-to-everything (V2X) and/or URLLC.

Some embodiments provide a nested HARQ protocol for HARQ transmission with an outer code. The nested HARQ protocol addresses the technical problem of how to respond to errors in a transmitted parity code block, e.g. an error introduced by the channel in a retransmission having one or more parity code blocks.

In one embodiment, there is provided a method performed by a network device. The method includes encoding each information block of m information blocks to obtain a respective encoded code block. The method may further include transmitting the m encoded code blocks. The method may further include computing N parity blocks from the m information blocks by, for each one of the N parity blocks, performing an XOR operation on all of the m information blocks or cyclic shifts thereof. In some embodiments, 1<N≤m. The method may further include encoding each parity block of the N parity blocks to obtain N encoded parity code blocks. The method may further include transmitting the N encoded parity code blocks. A corresponding network device configured to perform the method is also provided in some embodiments.

In another embodiment, there is provided a method performed by a network device that includes receiving m encoded code blocks, each one of the m encoded code blocks corresponding to a respective information block that has been encoded. The method may further include decoding the m encoded code blocks. The method may further include, in response to decoding failing for N≤m of the encoded code blocks: (i) transmitting feedback indicating a quantity N of failed code blocks, possibly without identifying which ones of the m code blocks were incorrectly decoded; and/or (ii) receiving N encoded parity blocks; and/or (iii) decoding the N encoded parity blocks to obtain N parity blocks. The method may further include decoding the N incorrectly decoded information blocks using the N parity blocks. A corresponding network device configured to perform the method is also provided in some embodiments.

By performing some embodiments herein, the following technical benefits may be realized. The amount of data retransmitted may be reduced because only parity blocks equal in number to the failed encoded code blocks may need to be retransmitted. The overhead of HARQ feedback may be reduced compared to sending a CBG index because in some embodiments the feedback only indicates how many CBs failed, without identifying which specific CBs failed.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Example Communication Systems and Devices

Figure 1:
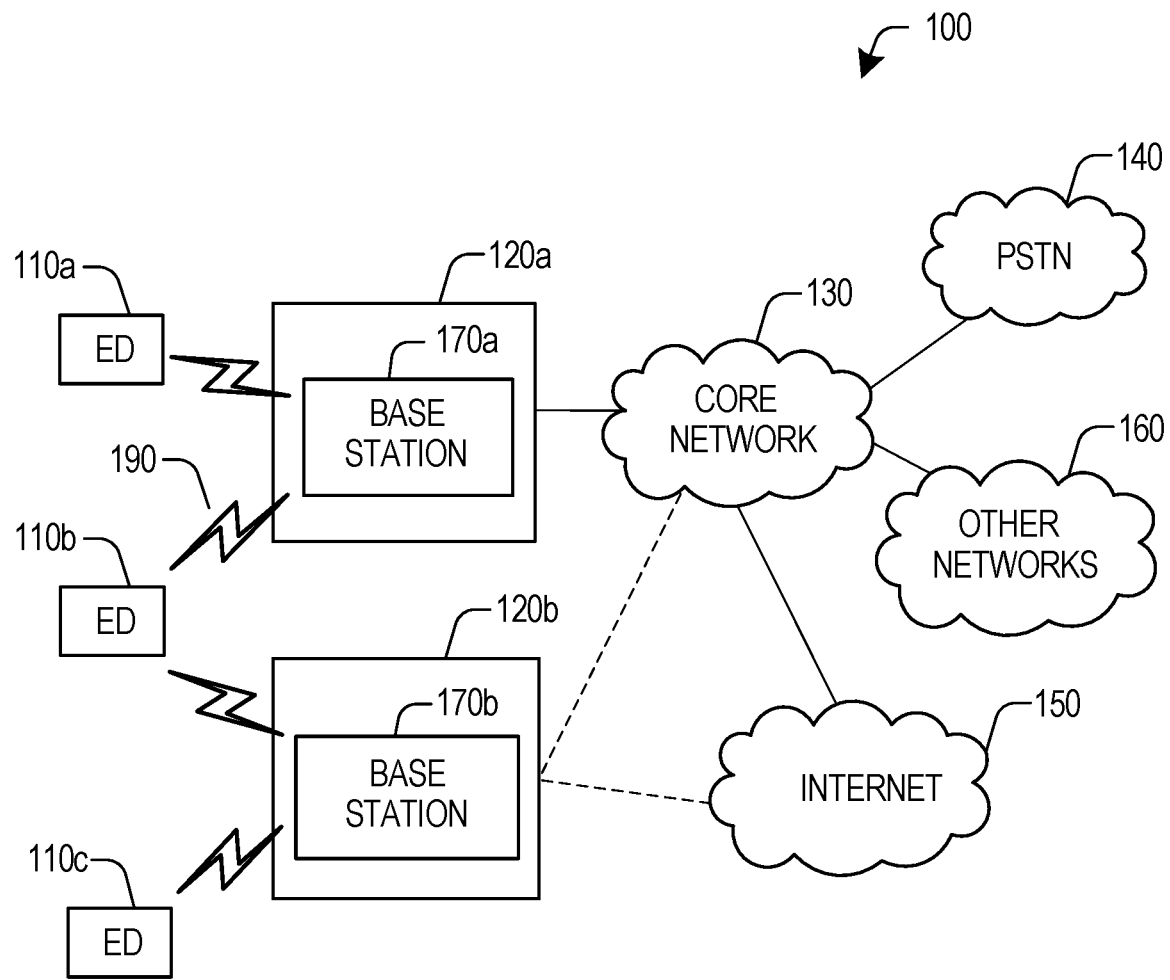
FIG. 1 is a network diagram of an example communication system.

FIG. 1 illustrates an example communication system 100. In general, the communication system 100 enables multiple wireless or wired elements to communicate data and other content. The purpose of the communication system 100 may be to provide content, such as voice, data, video, and/or text, via broadcast, narrowcast, user device to user device, etc. The communication system 100 may operate by sharing resources, such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1X, CDMA2000 EV-DO, IS-2000, IS-95, IS-856, GSM, EDGE, and GERAN. Other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2:
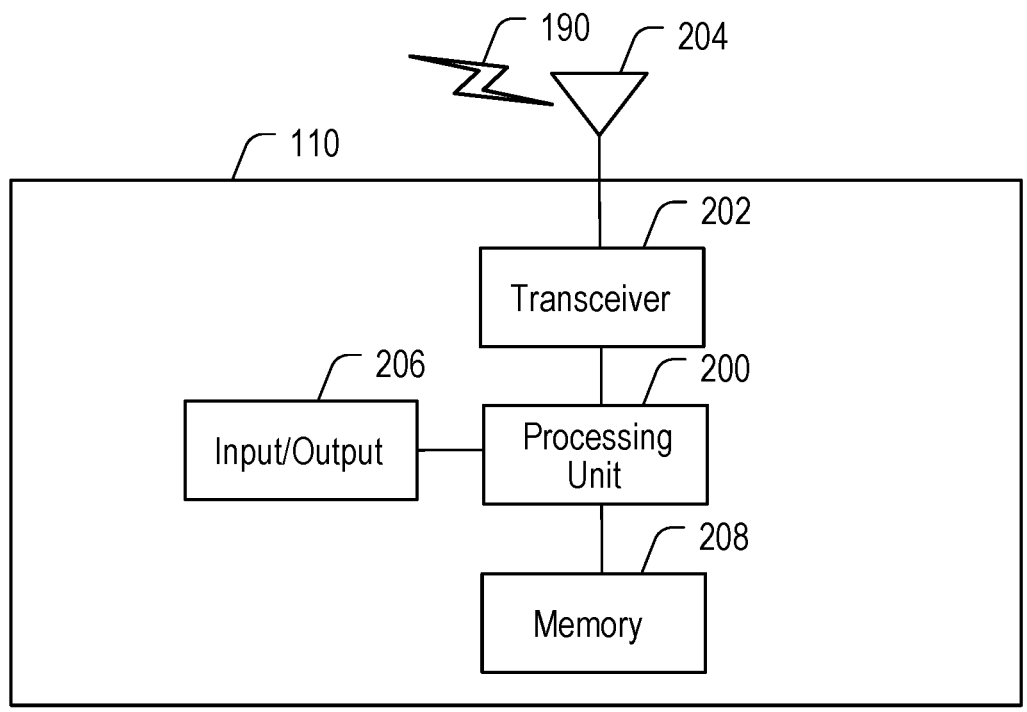
FIG. 2 is a block diagram of an example electronic device.
Figure 3:
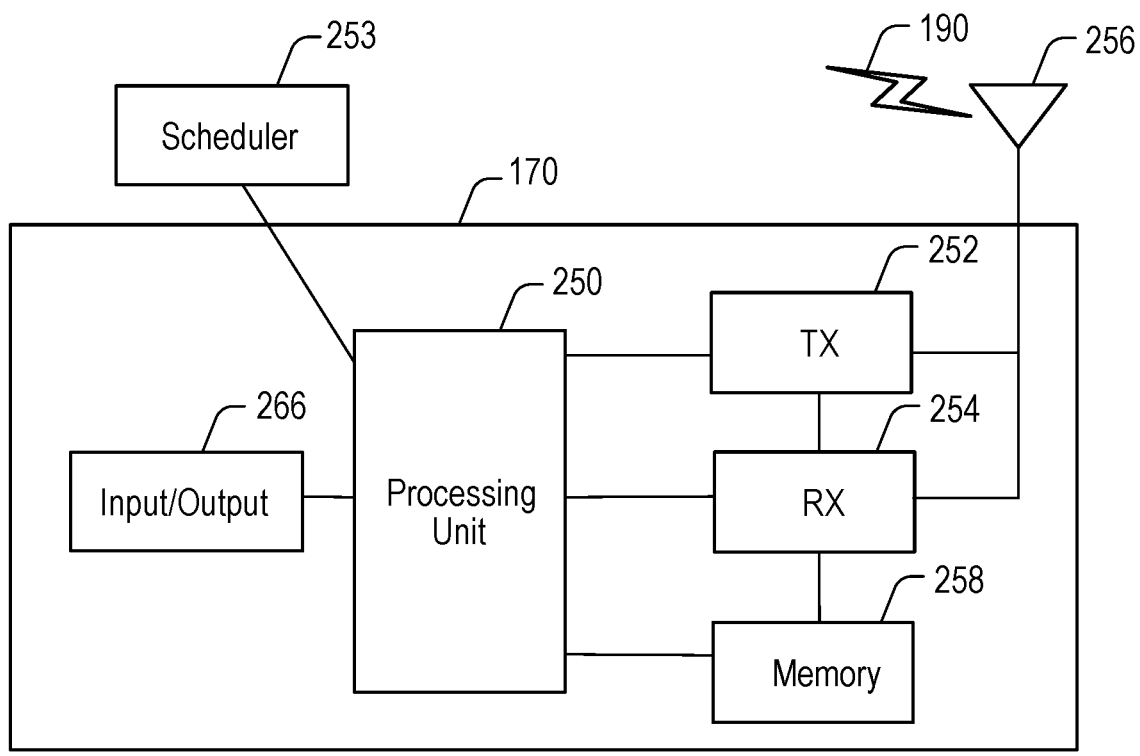
FIG. 3 is a block diagram of another example electronic device.

FIGS. 2 and 3 illustrate example devices that may implement the methods and teachings according to this disclosure. In particular, FIG. 2 illustrates an example ED 110, and FIG. 3 illustrates an example base station 170. These components could be used in the communication system 100 or in any other suitable system.

As shown in FIG. 2, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110.For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 4:
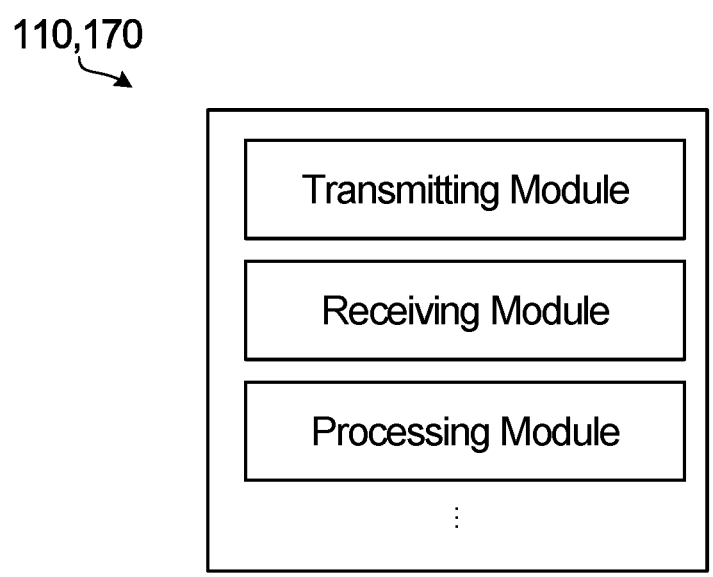
FIG. 4 is a block diagram of example component modules.

One or more steps of the embodiment methods provided herein may be performed by corresponding units or modules, according to FIG. 4. FIG. 4 illustrates units or modules in a device, such as in ED 110 or base station 170. For example, a signal may be transmitted by a transmitting unit or a transmitting module. A signal may be received by a receiving unit or a receiving module. A signal may be processed by a processing unit or a processing module. The processing module may encompass the units/modules described later, such as the encoder and decoder described below. Other units/modules may be included in FIG. 4, but are not shown. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

Figure 5:
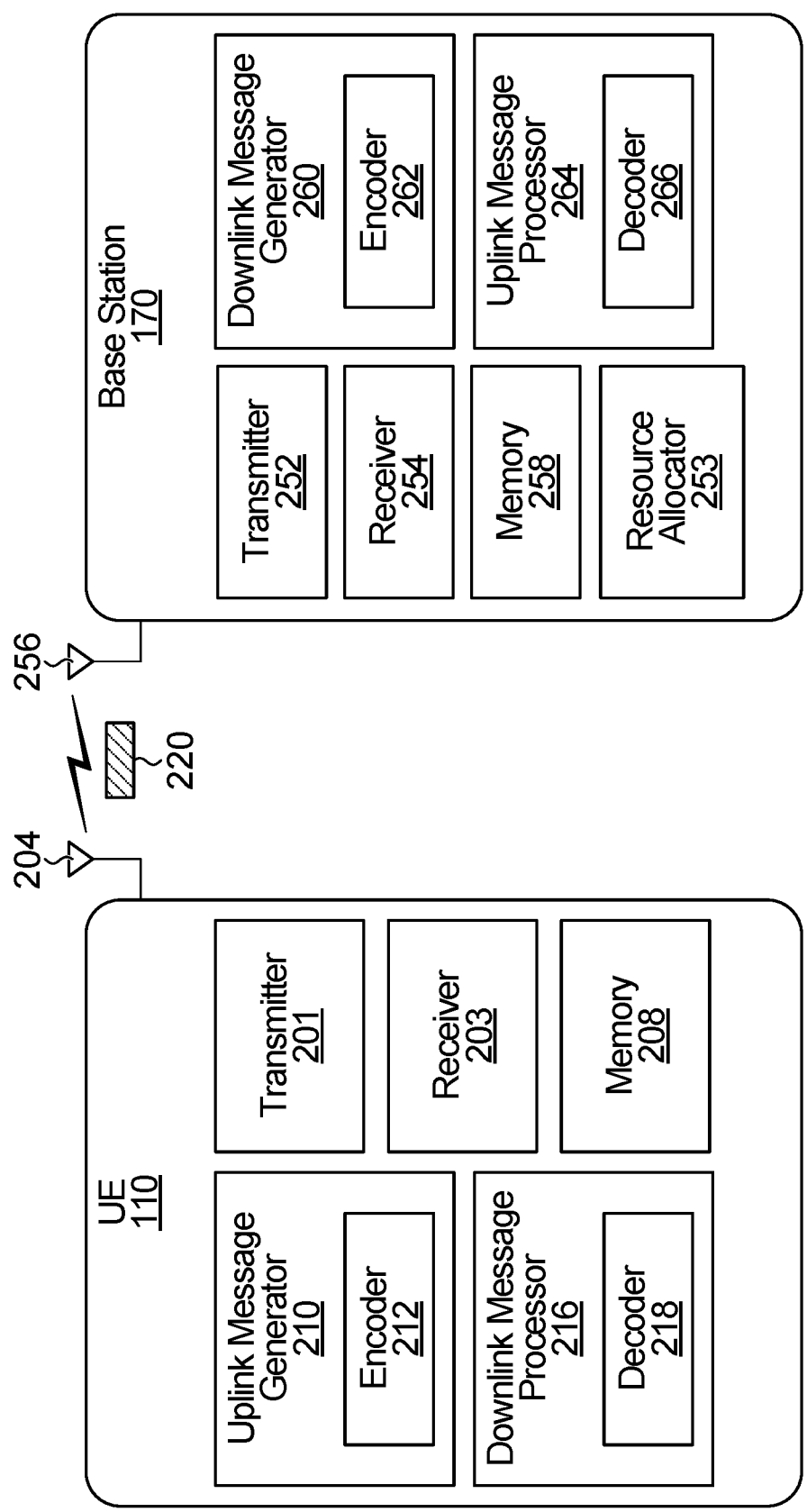
FIG. 5 is a block diagram of an example user equipment and base station.

FIG. 5 illustrates another example of an ED 110 and a base station 170. The ED 110 will hereafter be referred to as a user equipment (UE) 110. Data 220 is illustrated as being wirelesly transmitted between the base station 170 and the UE 110. The data 220 may be one or more of the encoded information codeblocks (CBs) and/or parity CBs described later.

The base station 170 may be called other names in some implementations, such as a transmit and receive point (TRP), a base transceiver station, a radio base station, a network node, a transmit/receive node, a Node B, an evolved NodeB (eNodeB or eNB), a gNB, a relay station, or a remote radio head. In some embodiments, thefunctions of the base station 170 may be distributed. For example, some of the modules of the base station 170 may be located remote from the equipment housing the antennas of the base station 170, and may be coupled to the equipment housing the antennas over a communication link (not shown). Therefore, in some embodiments, the term base station 170 may also refer to modules on the network side that perform processing operations, such as resource allocation, message generation, and encoding/decoding, and that are not necessarily part of the equipment housing the antennas of the base station 170. The modules may also be coupled to other base stations. In some embodiments, the base station 170 may actually be a plurality of base stations that are operating together to serve the UE 110, e.g. through coordinated multipoint transmissions.

The base station 170 includes a transmitter 252 and a receiver 254 coupled to one or more antennas 256. Only one antenna 256 is illustrated. The transmitter 252 and the receiver 254 may be integrated as a transceiver. The base station 170 further includes a downlink message generator 260 for generating a downlink transmission to be sent to the UE 110. The downlink message generator 260 includes an encoder 262 for encoding the data to be sent in the downlink transmission. The downlink message generator 260 may be part of the transmitter 252. The base station 170 further includes an uplink message processor 264 for processing uplink transmissions received from the UE 110, e.g. for generating HARQ feedback. The uplink message processor 264 includes a decoder 266 for decoding the uplink transmission, e.g. for performing the decoding described later. The uplink message processor 264 may be part of the receiver 254. The base station 170 further includes a resource allocator 253, which may schedule the uplink resources to be allocated to UE 110 for uplink transmissions, and which may also schedule downlink transmissions. The base station 100 further includes a memory 258 for storing information and data.

The downlink message generator 260, the encoder 262, the uplink message processor 264, the decoder 266, the resource allocator 253, and/or any signal processing components of the transmitter 252 and receiver 254, may be implemented in the form of circuitry configured to perform the functions of the downlink message generator 260, the encoder 262, the uplink message processor 264, the decoder 266, the resource allocator 253, and/or the transmitter 252 and receiver 254. In some implementations the circuitry includes memory 258 and one or more processors, such as processing unit 250 described earlier, that execute instructions that cause the one or more processors to perform the operations of the downlink message generator 260, the encoder 262, the uplink message processor 264, the decoder 266, the resource allocator 253, and/or the transmitter 252 and receiver 254. Alternatively, the downlink message generator 260, the encoder 262, the uplink message processor 264, the decoder 266, the resource allocator 253, and/or the transmitter 252 and receiver 254, may be implemented by a processing unit using dedicated integrated circuitry, such as an ASIC, a GPU, or an FPGA for performing the operations of the downlink message generator 260, the encoder 262, the uplink message processor 264, the decoder 266, the resource allocator 253, and/or the transmitter 252 and receiver 254.

The UE 110 also includes a transmitter 201 and a receiver 203 coupled to one or more antennas 204. Only one antenna 204 is illustrated. The transmitter 201 and the receiver 203 may be integrated as a transceiver, e.g. transceiver 202. The UE 110 further includes a downlink message processor 216, including a decoder 218. The downlink message processor 216 and decoder 218 perform operations relating to processing a received downlink message, such as decoding received code blocks and generating HARQ feedback. The downlink message processor 216 may be part of the receiver 203. The UE 110 further includes an uplink message generator 210, including an encoder 212. The uplink message generator 210 and encoder 212 perform operations relating to generating an uplink transmission. The uplink message generator 210 may be part of the transmitter 201. The UE 110 further includes a memory 208 for storing information and data.

The downlink message processor 216, the decoder 218, the uplink message generator 210, the encoder 212, and/or any signal processing components of the transmitter 201 and receiver 203, may be implemented in the form of circuitry configured to perform the functions of the downlink message processor 216, the decoder 218, the uplink message generator 210, the encoder 212, and/or the transmitter 201 and receiver 203. In some implementations the circuitry includes memory 208 and one or more processors, such as processing unit 200 described earlier, that execute instructions that cause the one or more processors to perform the operations of the downlink message processor 216, the decoder 218, the uplink message generator 210, the encoder 212, and/or the transmitter 201 and receiver 203. Alternatively, the downlink message processor 216, the decoder 218, the uplink message generator 210, the encoder 212, and/or the transmitter 201 and receiver 203, may be implemented by a processing unit using dedicated integrated circuitry, such as an ASIC, a GPU, or an FPGA for performing the operations of the downlink message processor 216, the decoder 218, the uplink message generator 210, the encoder 212, and/or the transmitter 201 and receiver 203.

The base station 170 and the UE 110 may include other components, but these have been omitted for the sake of clarity.

Figure 6:
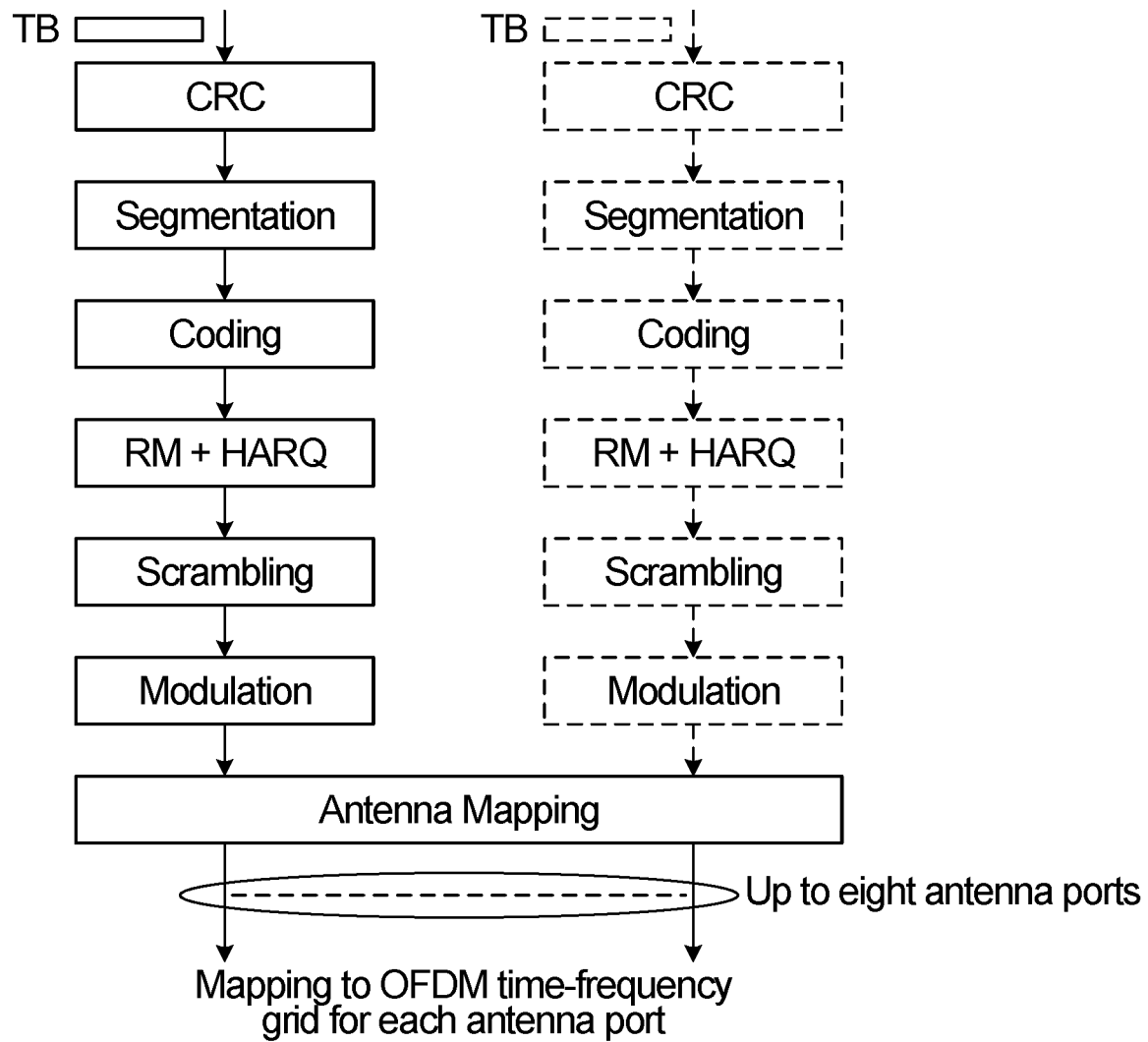
FIG. 6 is a block diagram of an example of physical layer processing.

FIG. 6 illustrates an example of physical layer processing that may be performed by a transmitting device, e.g. by the base station 170. The blocks in stippled lines indicate that they are optional. CRC is inserted into each TB, followed by code-block segmentation, including possible per-code-block CRC insertion. Channel coding is then performed. Rate matching and physical layer HARQ functionality is then performed, followed by bit level scrambling, data modulation, and antenna mapping. In the example illustrated in FIG. 6, there are up to eight antenna ports. The antenna mapping includes mapping to an OFDM time-frequency grid for each antenna port.

Figure 7:
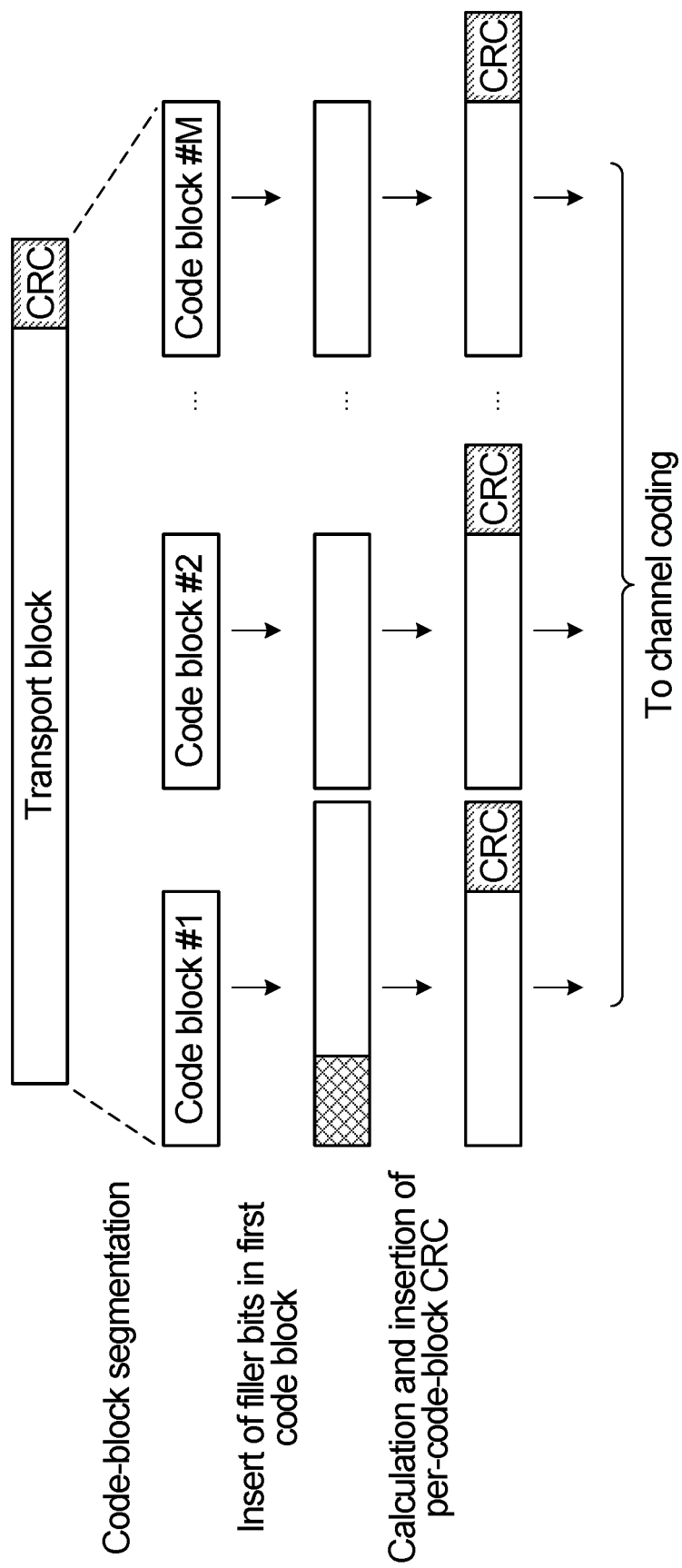
FIG. 7 is one example of code-block segmentation.

FIG. 7 illustrates one example of code-block segmentation in more detail. A TB is segmented into M code blocks. Filler bits are optionally inserted into the first code block, as needed, to ensure proper code block size. An additional CRC is calculated for and appended to each code block. Each code block then undergoes the channel coding. The channel coding applies an inner code, which is different from, and in addition to, the outer coding described later.

Figure 8:
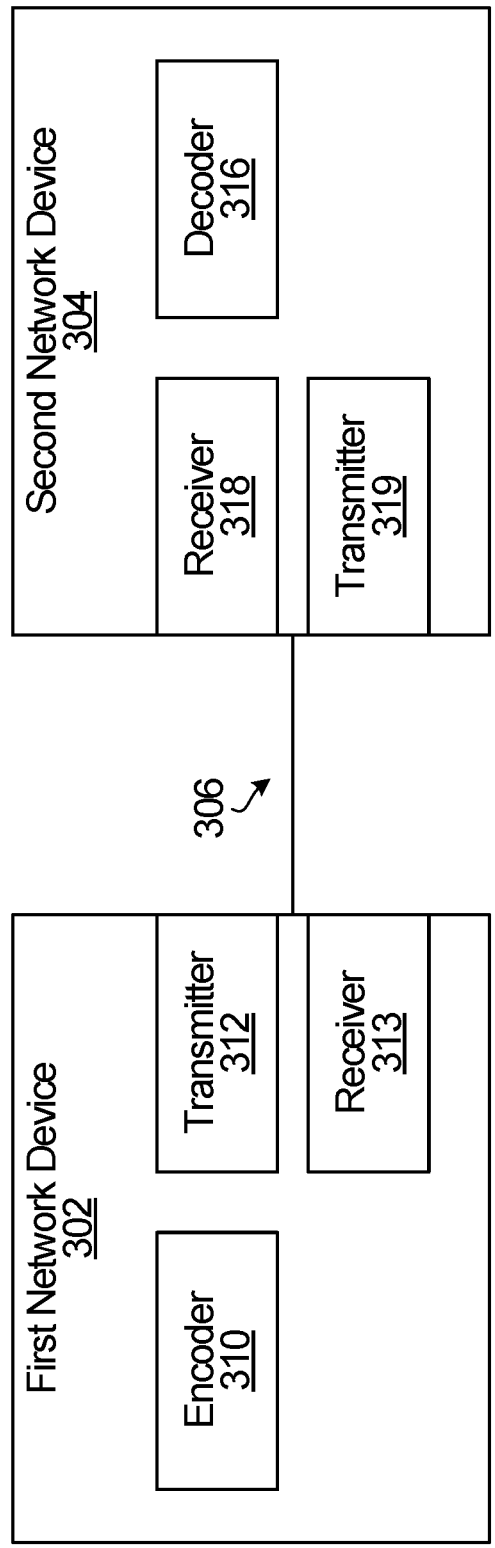
FIG. 8 is a block diagram of example first and second network devices.

FIG. 8 illustrates more generally a first network device 302 and a second network device 304 that communicate over a channel 306. In some embodiments, the first network device 302 is a UE, e.g. UE 110, and the second network device 304 is a base station, e.g. base station 170. In other embodiments, the first network device 302 is a base station, e.g. base station 170, and the second network device 304 is a UE, e.g. UE 110. In other embodiments, the first network device 302 and second network device 304 are both UEs or both base stations, or any other network components.

The first network device 302 includes an encoder 310. In some embodiments, the encoder 310 may be encoder 212 or encoder 262. The first network device 302 also includes a transmitter 312 to transmit the output of encoder 310 over the channel 306, and a receiverb 313 to receive HARQ feedback from the second network device 304. The first network device 302 may include other components, but these have been omitted for the sake of clarity. The encoder 310 may be implemented using one or more processors that execute instructions that cause the one or more processors to perform the operations of the encoder 310. Alternatively, the encoder 310 may be implemented using dedicated integrated circuitry, such as an ASIC, a GPU, or an FPGA for performing the operations of the encoder 310. The transmitter 312 and receiver 313 may be implemented using an antenna and related circuitry. Any signal processing components of the transmitter 312 and receiver 313 may be implemented using one or more processors executing instructions and/or integrated circuitry, such as an ASIC, a GPU, or an FPGA.

The second network device 304 includes a decoder 316. In some embodiments, the decoder 316 may be decoder 218 or decoder 266. The second network device 304 also includes a receiver 318 to receive the transmission sent over the channel 306, and a transmitter 319 to transmit HARQ feedback. The second network device 304 may include other components, but these have been omitted for the sake of clarity. The decoder 316 may be implemented using one or more processors that execute instructions that cause the one or more processors to perform the operations of the decoder 316. Alternatively, the decoder 316 may be implemented using dedicated integrated circuitry, such as an ASIC, a GPU, or an FPGA for performing the operations of the decoder 316. The receiver 318 and transmitter 319 may be implemented using an antenna and related circuitry. Any signal processing components of the receiver 318 and transmitter 319 may be implemented using one or more processors executing instructions and/or integrated circuitry, such as an ASIC, a GPU, or an FPGA.

The first network device 302 has data to transmit to the second network device 304 in the form of a plurality of bits. The plurality of bits are first partitioned into a plurality of chunks, e.g. by the encoder 310. Each chunk is referred to as an information code block (CB). In embodiments in which TBs are used for data transmission, a TB may be partitioned into the plurality of information CBs, or the plurality of information CBs may be mapped to one or more TBs for transmission, depending upon the implementation. In some embodiment, a CRC for the TB may be first appended to the TB before segmentation of TB to different CBs. The encoder 310 appends a cyclic redundancy check (CRC) check to each information CB and then encodes each information CB using a channel code to obtain an encoded information CB. The channel code used is implementation specific and different channel codes may be applied to different information CBs. Examples of channel codes that may be used include polar codes, turbo codes, and low-density parity-check (LDPC) codes. The encoding of individual CBs is referred to as "inner coding" or "applying an inner code". Note that "outer code" and "inner code" refer to concatenating two codes together. When concatenating two codes, the information bits are first encoded by the outer code, the output of outer code is then encoded by the inner code. The output of the inner code is then transmitted through the wireless channel. In the decoder side, the inner code decoder is first used to decode inner code and the output is then sent to the outer code decoder to decode the information bits. In the decoding process, the inner code is first decoded for each CB to obtain information bits of each CB, and then the CRC of each CB can be used to check whether the CB is decoded correctly or not. Then the outer coding, if used, may be further decoded to recover any failed CBs using the output CBs of inner code.

Figure 9:
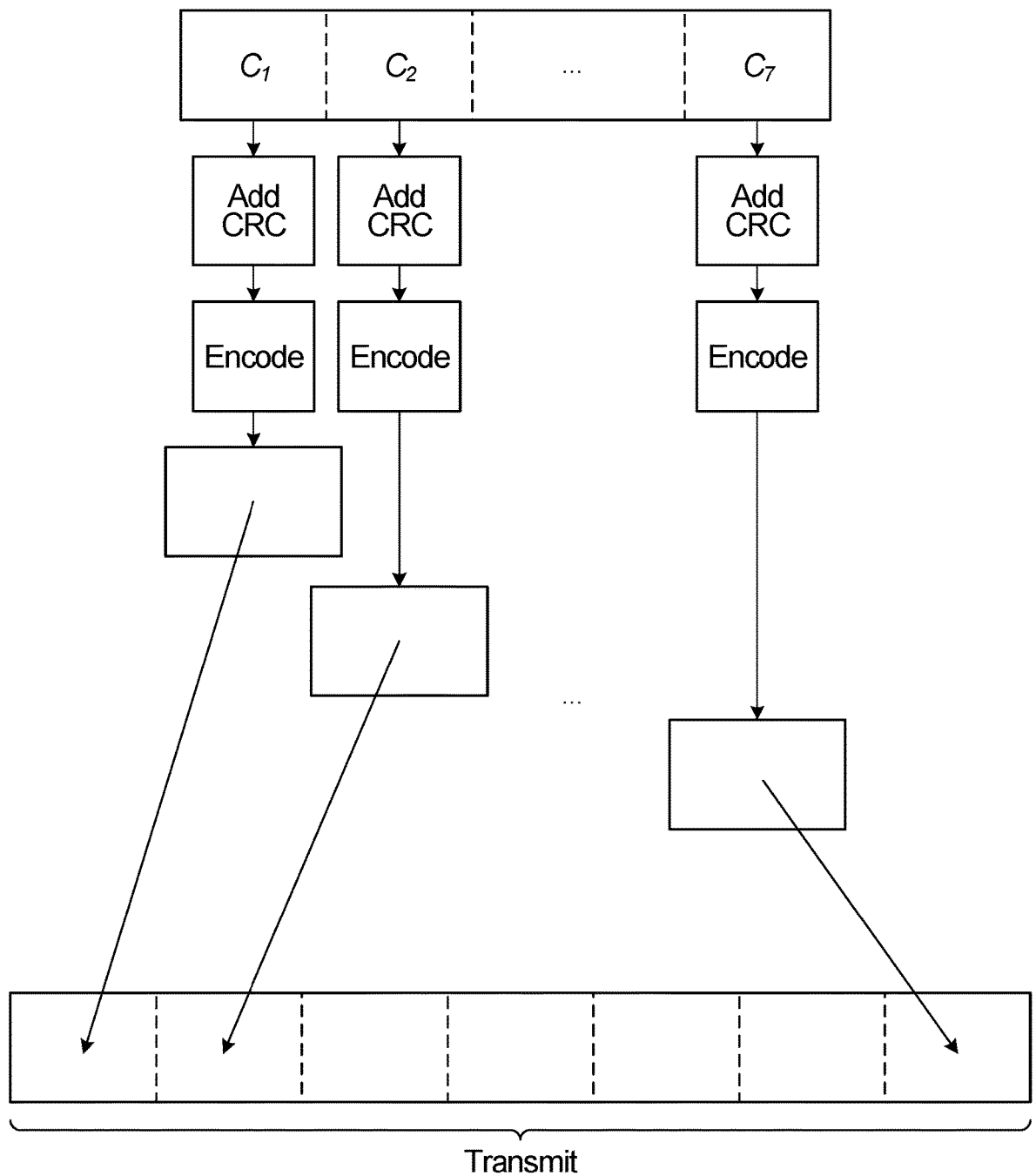
FIG. 9 illustrates an example of inner coding.

An example of inner coding is illustrated in FIG. 9. Seven information CBs are to be transmitted, labelled $C_1$ to $C_7$. The notation $C_i$ is used herein to refer to an i-th CB that carries information. Information CBs are distinct from parity CBs, as will be described later. Parity CBs are CBs that are used to transmit parity information generated as part of an outer code.

In the method illustrated in FIG. 9, each information CB has a CRC appended to it and is then encoded by a channel code as the inner code. The encoded output is then transmitted over the channel 306 by transmitter 312. One or more parity CBs may also be generated by the encoder 310 in the manner explained later, and each parity CB may be further encoded using the inner channel code and transmitted over the channel 306, e.g. along with the information CBs $C_1$ to $C_7$, or in response to feedback from the second network device 304 indicating that decoding failed for one or more of information CBs $C_1$ to $C_7$.

In general, m information CBs $C_1$ to $C_m$ may be transmitted from the first network device 302 to the second network device 304. Inner coding is applied in the manner described above in relation to FIG. 9. Each information CB $C_i$, $1 \le i \le m$, has k bits. k designates the length of a CB in terms of number of elements, i.e. number of bits in the CB. In some embodiments below, k is a prime number so that there are no repeated patterns with the cyclic shift design described below. In the embodiments described below, the number of bits in each CB is assumed to be the same. However, the embodiments can be easily extended to the case where the number of bits in different CBs are different. For example, the encoder can pad some CBs with unused or predetermined bits to make the total number of bits in different CBs equal.

A particular information CB $C_i$ is designated as $C_i = \{C_{i,0}, C_{i,1}, \ldots, C_{i,k-1}\}$. The element $C_{i,l}$, where $0 \le l \le k-1$, refers to the l-th element of $C_i$.

A CB $C_i$ that undergoes a left cyclic shift by x elements is designated as $C_i^{(x)}$. In the following, x is also referred to as the cyclic shift value. For example, $C_1^{(0)} = C_1 = \{C_{1,0}, C_{1,1}, C_{1,2}, C_{1,3}, \ldots, C_{1,k-1}\}$, $C_1^{(1)} = \{C_{1,1}, C_{1,2}, C_{1,3}, \ldots, C_{1,k-1}, C_{1,0}\}$, $C_1^{(2)} = \{C_{1,2}, C_{1,3}, \ldots, C_{1,k-1}, C_{1,0}, C_{1,1}\}$, etc. $C_{i,l}^{(x)}$ refers to the $l^{th}$ element of $C_i$ after $C_i$ undergoes a left cyclic shift by x elements. This can be expressed as $C_{i,l}^{(x)} = C_{i,(l+x) \bmod k}$, where mod is the modular operation. Note that if x=0 then there is no cyclic shift, i.e. $C_i^{(0)} = C_i$. Also, although not explicitly indicated in the notation, any cyclic shift is mod k, i.e. $C_i^{(x)}$ is equal to $C_i^{(x \bmod k)}$. For example, if k=5 and x=6, then $C_i^{(6)} = C_i^{(1)}$.

Figure 10:
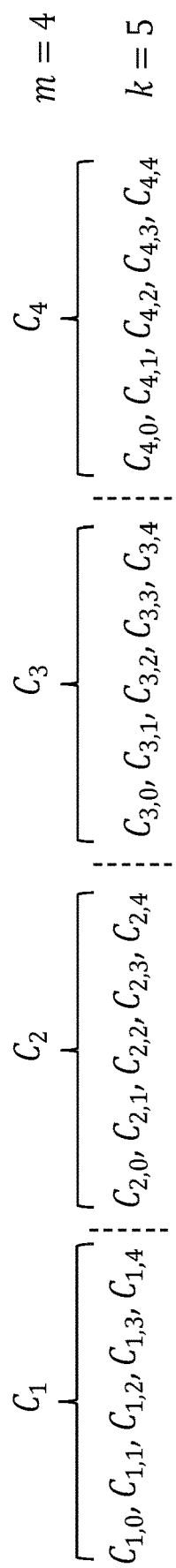
FIG. 10 illustrates four information code blocks.
Figure 11:
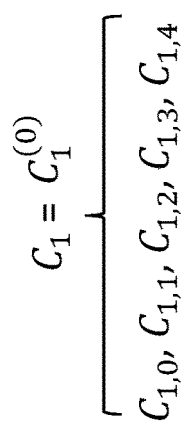
FIG. 11 illustrates a left cyclic shift of code block $C_1$ of FIG. 10.
Figure 11:
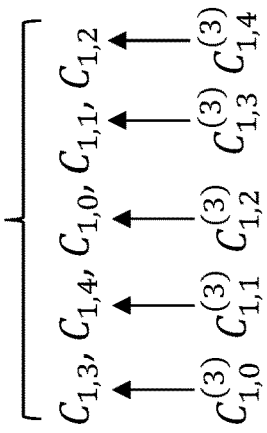

As an example, FIG. 10 illustrates m=4 information CBs, each of length k=5. FIG. 11 illustrates $C_1^{(3)}$, i.e. a left cyclic shift of $C_1$ of FIG. 10 by three elements. The elements $C_{1,0}^{(3)} = C_{1,3}$, $C_{1,1}^{(3)} = C_{1,4}$, $C_{1,2}^{(3)} = C_{1,0}$, $C_{1,3}^{(3)} = C_{1,1}$, and $C_{1,4}^{(3)} = C_{1,2}$ are also illustrated.

An outer code may be implemented by encoder 310 by computing and sending N parity CBs. The N parity CBs are generated from the m information CBs. The N parity CBs are used by the decoder 316 to correct up to N failed information CBs. A "failed" information CB refers to an information CB $C_i$ that is not correctly decoded via the decoding of the inner code by the decoder 316 in the second network device 304.

A particular parity CB $P_j$, where $1 \le j \le N$, also has a length k and is designated as $P_j = \{P_{j,0}, P_{j,1}, \ldots P_{j,k-1}\}$. The element $P_{j,l}$, where $0 \le l \le k-1$, refers to the l-th element of the parity CB $P_j$. A left cyclic shift of a parity CB $P_j$ is designated using the same notation as for a left cyclic shift of an information CB $C_i$.

Figure 12:
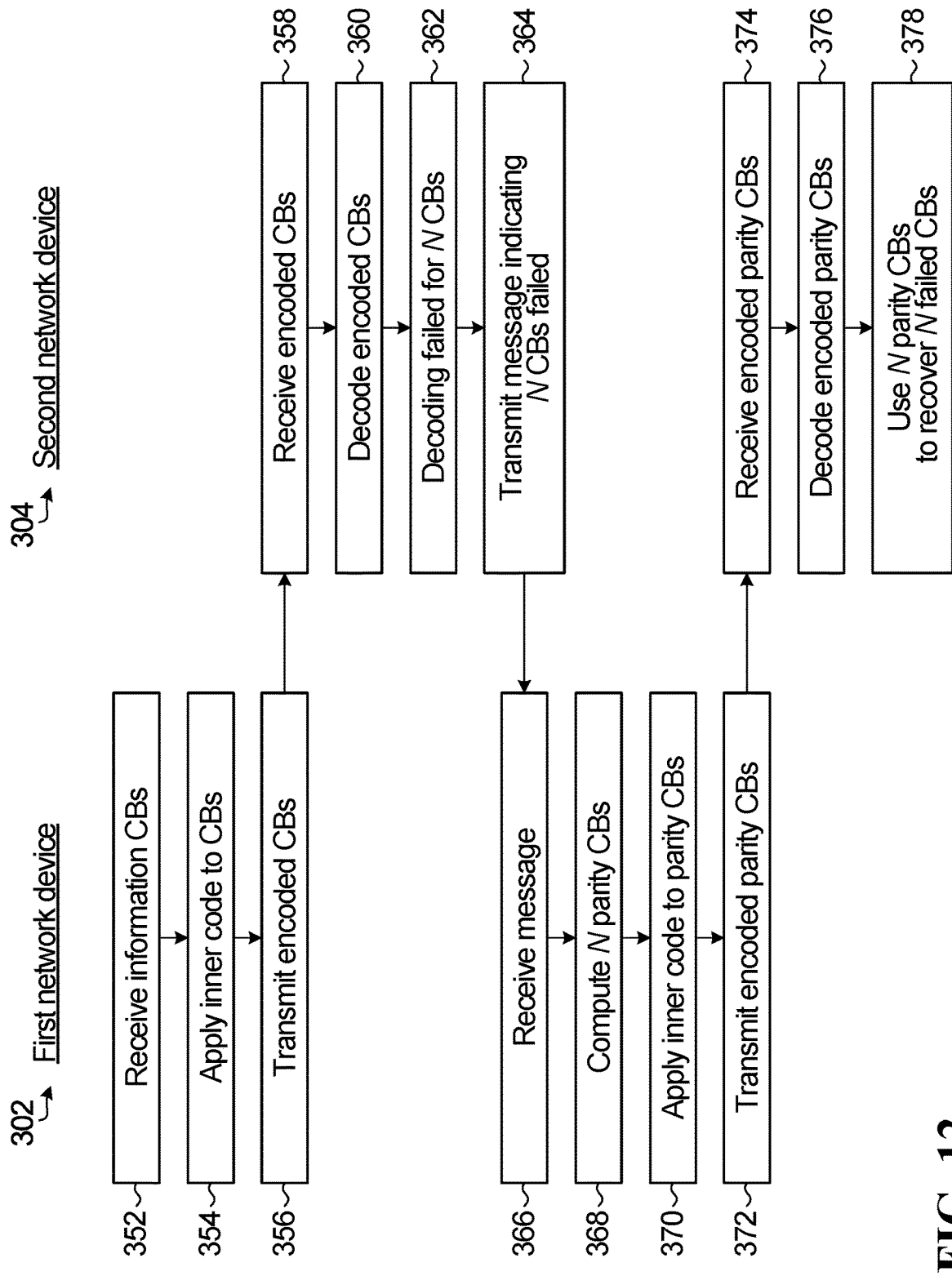
FIG. 12 is a flowchart of one example method performed by first and second network devices.

FIG. 12 illustrates a method performed by the first network device 302 and the second network device 304, according to one embodiment. In step 352, a plurality of information CBs $C_1$ to $C_m$ are received at encoder 310 of the first network device 302. The information CBs, before encoding, are data blocks or information blocks, but are referred to herein as "code" blocks (CBs) because they are blocks of data/information that are to be encoded via an inner code. After encoding, the CBs become encoded CBs. In step 354, an inner code is applied to the information CBs to generate encoded information CBs, e.g. as per the method explained in relation to FIG. 9. In step 354, a CRC may be appended for the information CBs before being encoded using the inner code as described earlier. In step 356, the encoded information CBs are transmitted to the second network device 304 using transmitter 312. The transmitting process may include rate matching and physical layer HARQ functionality is then performed, followed by bit level scrambling, data modulation, and antenna mapping as described earlier. In step 358, the encoded information CBs are received at the second network device 304 using receiver 318. The received encoded information CBs may have errors, which may be introduced by noise in the channel 306 or by other causes. In step 360, the decoder 316 decodes each of the encoded information CBs. In step 362, decoding fails for $N \le m$ of the encoded information CBs. In step 364, the second network device transmits, using transmitter 319, a message indicating that N CBs failed. The message does not necessarily indicate which ones of the CBs failed, just the number N of CBs that failed, which reduces overhead of the feedback compared to indicating which ones of the CBs failed. For example, feedback indicating the number of failed CBs may require $\log_2 m$ bits, whereas feedback indicating which CBs have failed may require m bits. In step 366, the receiver 313 of the first network device 302 receives the feedback message. In step 368, the encoder 310 generates an outer code by computing N parity CBs $P_1$ to $P_N$ in the manner described later. In step 370, the encoder 310 encodes each parity CB using an inner code, e.g. as per the method explained in relation to FIG. 9. A CRC may be appended for the parity CBs before being encoded by the inner code as described earlier. In step 372, the transmitter 312 transmits the N encoded parity CBs $P_1$ to $P_N$. In step 74, the receiver 318 of the second network device 304 receives the N encoded parity CBs $P_1$ to $P_N$. The received encoded parity CBs may have errors introduced by noise in the channel 306 or by other causes. In step 376, the decoder 316 decodes each of the encoded parity CBs. In this example method, each one of the N parity CBs is correctly decoded. In step 378, the decoder 316 uses the correctly decoded parity CBs $P_1$ to $P_N$ to decode the N failed information CBs. The decoding method is described later. Correctly decoding the N failed information CBs using the parity CBs $P_1$ to $P_N$ is referred to as 'recovering' the N failed information CBs.

Figure 13:
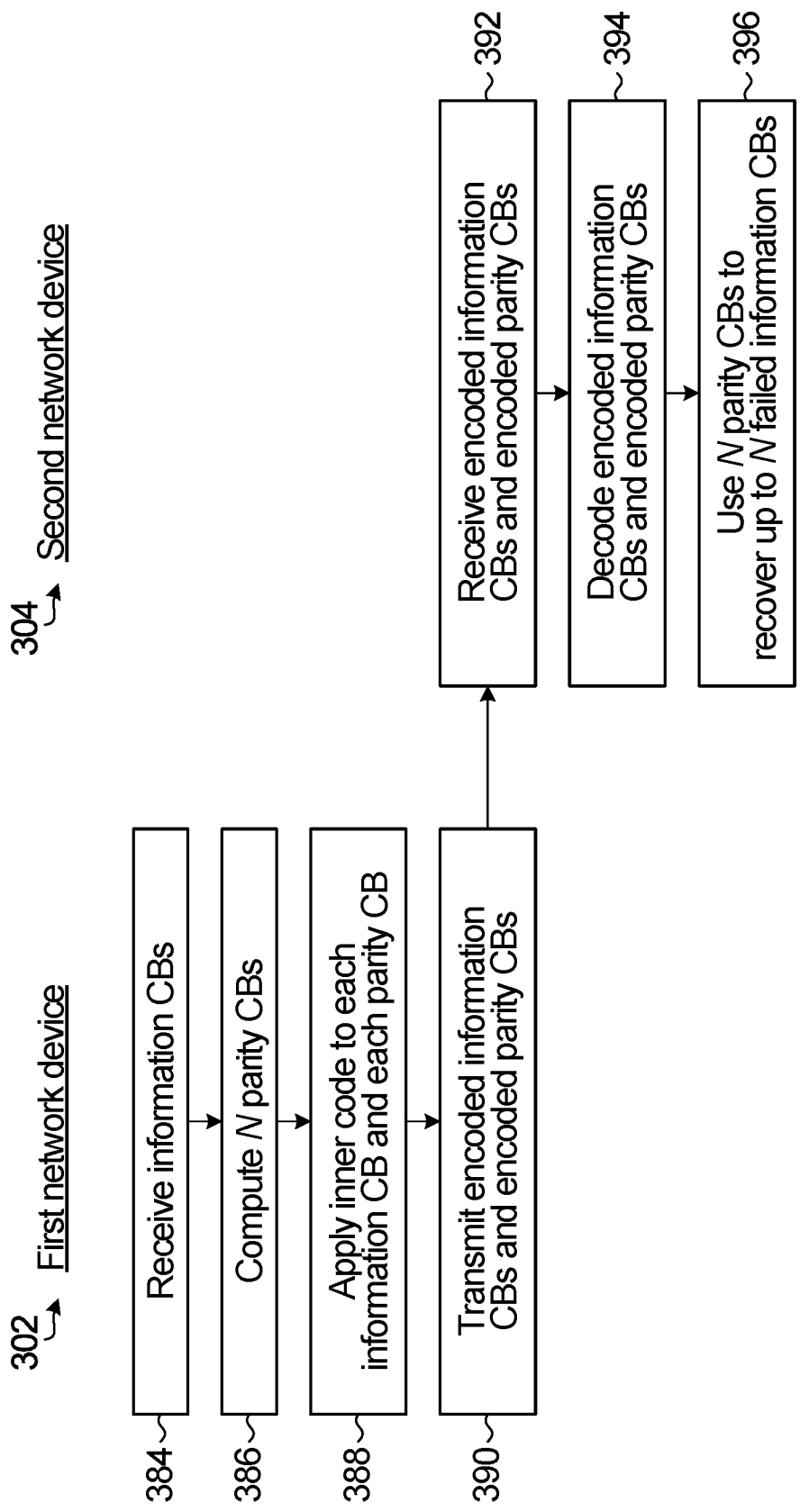
FIG. 13 is a flowchart of another example method performed by first and second network devices.

FIG. 13 illustrates a variation of FIG. 12 in which the N parity CBs are generated by the first network device 302 and sent along with the encoded information CBs. The N parity CBs are then used by the decoder 316 to recover up to N failed information CBs. In step 384, a plurality of information CBs $C_1$ to $C_m$ are received at encoder 310 of the first network device 302. In step 386, the encoder 310 generates an outer code by computing N parity CBs $P_1$ to $P_N$ in the manner described later. In step 388, an inner code is applied to each of the information CBs and parity CBs to generate encoded CBs, e.g. as per the method explained in relation to FIG. 9. In step 390, the encoded information and parity CBs are transmitted to the second network device 304 using transmitter 312. In step 392, the encoded CBs are received at the second network device 304 using receiver 318. The received encoded CBs may have errors introduced by noise in the channel 306 or by other causes. In step 394, the decoder 316 decodes each of the encoded information and parity CBs. In step 396, if decoding fails for y≤N of the encoded information CBs, then the failed y information CBs are recovered by the decoder 316 using y of the successfully decoded parity CBs. In another example, there may be errors in decoding both information CBs and parity CBs. The receiver can use the successfully decoded information CBs and parity CBs together to recover up to N total of failed information CBs and parity CBs.

FIGS. 12 and 13 are only examples. Many other variations and examples are possible. In another example, one or some encoded parity CBs may be sent along with the encoded information CBs. If not enough parity CBs were initially sent, then more parity CBs can be sent in another transmission. All the successfully decoded information CBs and successfully decoded parity CBs may be used to recover failed information CBs.

More generally, during operation the encoder 310 of the first network device 302 may need to compute N parity CBs for an outer code applied to m information CBs, e.g. as is the case in step 368 of FIG. 12 and step 386 of FIG. 13. The decoder 316 of the second network device 304 may need to use the received and correctly decoded N parity CBs to recover up to N failed information CBs, e.g. as is the case in step 378 of FIG. 12 and step 396 of FIG. 13. m and N are both positive integers greater than zero and 1≤N≤m.

Figure 14:
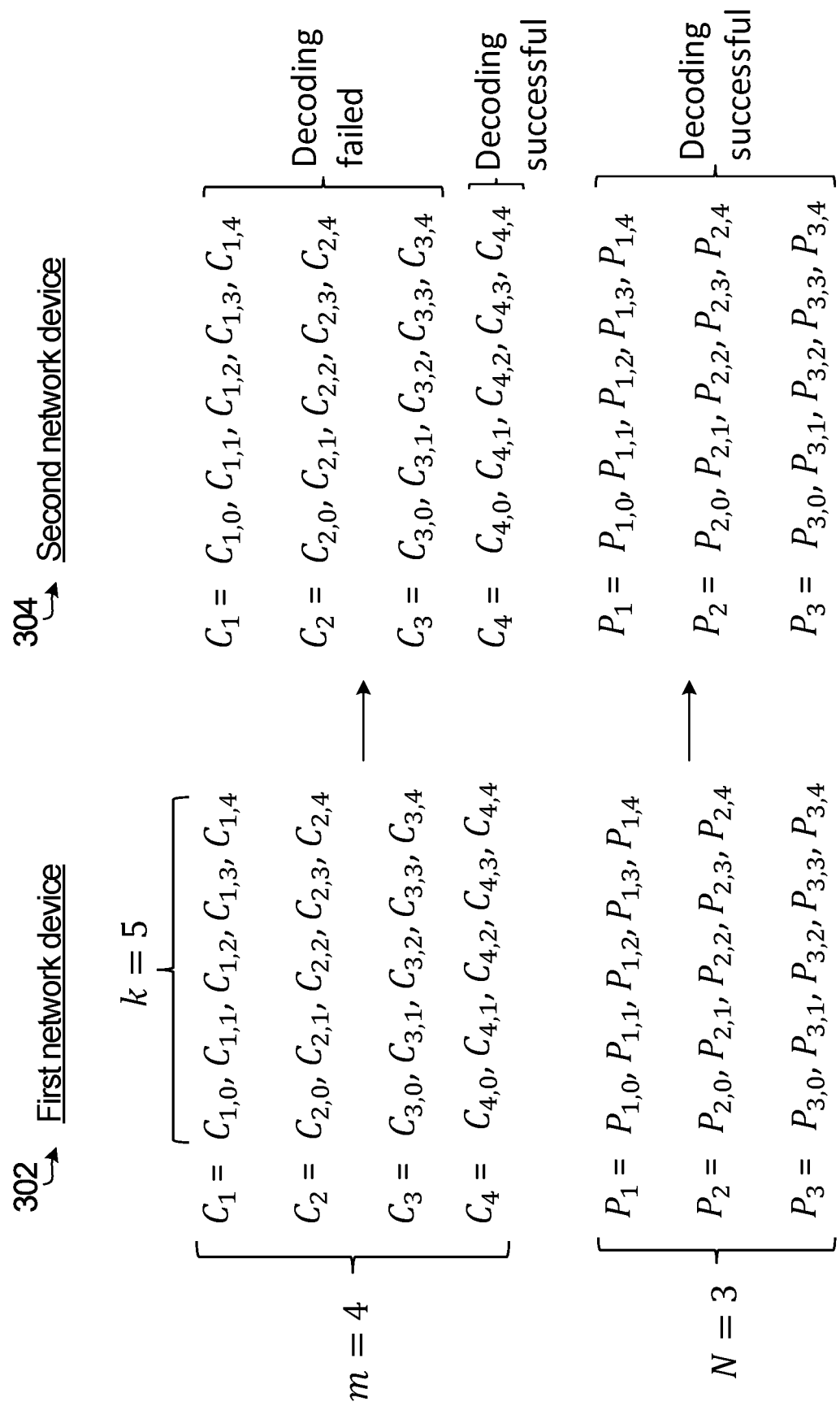
FIG. 14 illustrates an example of information and parity codeblocks.

The generation of N parity CBs by encoder 310, and the recovery of N failed information CBs by decoder 316, are explained below. To assist with the explanation, a simple example will be introduced and followed throughout the following discussion. In the example, m=4, k=5, and N=3. Also, without loss of generality, in the example information CBs $C_1$, $C_2$, and $C_3$ fail, none of the three parity CBs $P_1$, $P_2$, and $P_3$ fail, and the three parity CBs $P_1$, $P_2$, and $P_3$ are used to recover the three failed information CBs $C_1$, $C_2$, and $C_3$. FIG. 14 illustrates the information and parity CBs of the example.

Generation of the parity CBS

In one embodiment, the encoder 310 computes each parity CB $P_j$, 1=j≤N as follows:

$$P_j = C_1^{(0)} \oplus C_2^{((j-1)*1)} \ldots \oplus C_i^{((j-1)*(i-1))} \ldots \oplus C_m^{((j-1)*(m-1))} = \Sigma_{i=1}^m C_i^{((j-1)*(i-1))} \quad \text{(Equation 1).}$$

The symbol ⊕ used herein represents the XOR operation. The symbol Σ used herein refers to an XOR summation. The XOR of two CBs is implemented by XORing the two CBs on an element-by-element basis. That is, if $C_a = \{C_{a,0}, C_{a,1}, \ldots, C_{a,k-1}\}$ and $C_b = \{C_{b,0}, C_{b,1}, \ldots, C_{b,k-1}\}$, then $C_a \oplus C_b = \{C_{a,0} \oplus C_{b,0}, C_{a,1} \oplus C_{b,1}, \ldots, C_{a,k-1} \oplus C_{b,k-1}\}$. Therefore, each element $P_{j,l}$ of parity CB $P_j$ (1≤j≤N, 0≤l≤k−1) is computed by encoder 310 as:

$$P_{j,l} = C_{1,l}^{(0)} \oplus C_{2,l}^{((j-1)*1)} \ldots \oplus C_{i,l}^{((j-1)*(i-1))} \ldots \oplus C_{m,l}^{((j-1)*(m-1))} = \Sigma_{i=1}^m C_{i,l}^{((j-1)*(i-1))} \quad \text{(Equation 2).}$$

Referring to the example introduced earlier in relation to FIG. 14, the three parity CBs $P_1$, $P_2$, and $P_3$ are computed as follows using Equation 1:

$$P_1 = \Sigma_{i=1}^4 C_i^{((1-1)*(i-1))} = C_1 \oplus C_2 \oplus C_3 \oplus C_4$$

$$P_2 = \Sigma_{i=1}^4 C_i^{((2-1)*(i-1))} = C_1 \oplus C_2^{(1)} \oplus C_3^{(2)} \oplus C_4^{(3)}$$

$$P_3 = \Sigma_{i=1}^4 C_i^{((3-1)*(i-1))} = C_1 \oplus C_2^{(2)} \oplus C_3^{(4)} \oplus C_4^{(6)}$$

Note that $C_4^{(6)} = C_4^{(1)}$ because k=5.

On an element-by-element basis, the computations are:
$P_{1,0} = C_{1,0} \oplus C_{2,0} \oplus C_{3,0} \oplus C_{4,0}$; $P_{2,0} = C_{1,0} \oplus C_{2,1} \oplus C_{3,2} \oplus C_{4,3}$;
$P_{3,0} = C_{1,0} \oplus C_{2,2} \oplus C_{3,4} \oplus C_{4,1}$
$P_{1,1} = C_{1,1} \oplus C_{2,1} \oplus C_{3,1} \oplus C_{4,1}$; $P_{2,1} = C_{1,1} \oplus C_{2,2} \oplus C_{3,3} \oplus C_{4,4}$;
$P_{3,1} = C_{1,1} \oplus C_{2,3} \oplus C_{3,0} \oplus C_{4,2}$
$P_{1,2} = C_{1,2} \oplus C_{2,2} \oplus C_{3,2} \oplus C_{4,2}$; $P_{2,2} = C_{1,2} \oplus C_{2,3} \oplus C_{3,4} \oplus C_{4,0}$;
$P_{3,2} = C_{1,2} \oplus C_{2,4} \oplus C_{3,1} \oplus C_{4,3}$
$P_{1,3} = C_{1,3} \oplus C_{2,3} \oplus C_{3,3} \oplus C_{4,3}$; $P_{2,3} = C_{1,3} \oplus C_{2,4} \oplus C_{3,0} \oplus C_{4,1}$;
$P_{3,3} = C_{1,3} \oplus C_{2,0} \oplus C_{3,2} \oplus C_{4,4}$
$P_{1,4} = C_{1,4} \oplus C_{2,4} \oplus C_{3,4} \oplus C_{4,4}$; $P_{2,4} = C_{1,4} \oplus C_{2,0} \oplus C_{3,1} \oplus C_{4,2}$;
$P_{3,4} = C_{1,4} \oplus C_{2,1} \oplus C_{3,3} \oplus C_{4,0}$.

Figure 15:
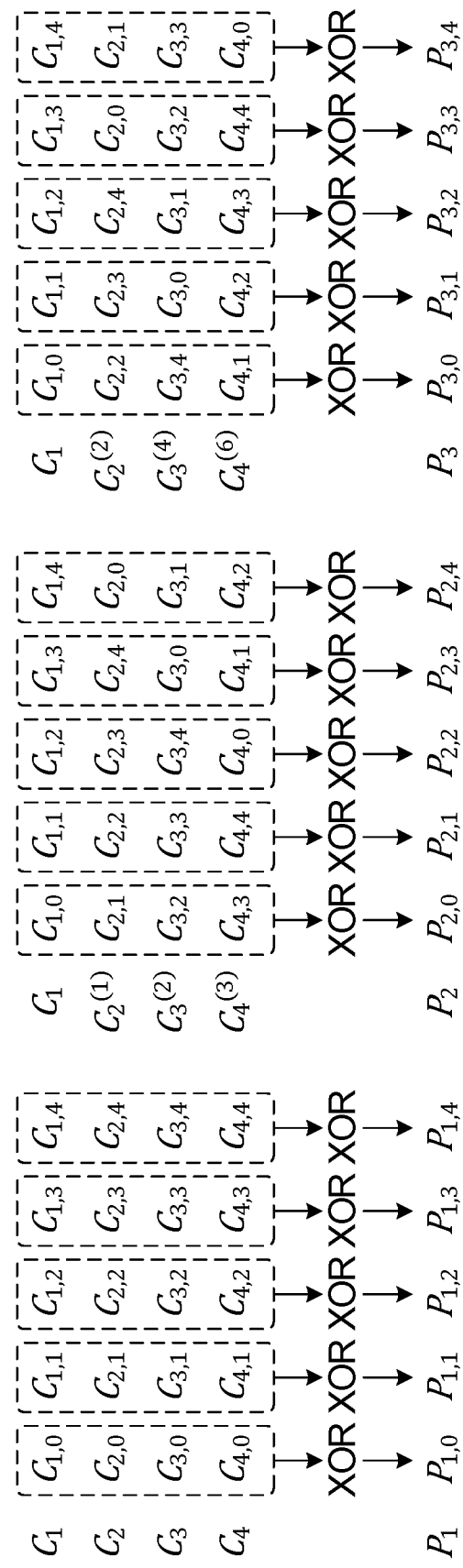
FIG. 15 illustrates the computation of three parity codeblocks by an encoder, according to one example.

The computations above are illustrated in FIG. 15.

Equation 1, and corresponding Equation 2, is just one example way to generate parity CBs. Alternative methods for generating N parity CBs from m information CBs are possible. For example, the cyclic shift applied to different codewords may be a right cyclic shift instead of a left cyclic shift. As another example, a permutation may be applied to the information CBs before generating the parity CBs. As another example, a permutation may be applied to the index of the parity CBs after generating the parity CBs. In another example, the order of parity CBs generated may also be changed. These alternatives may change Equation 1, and the decoding method described below would need to be appropriately modified.

More generally, the encoder 310 computes N parity CBs from m information CBs in a way that is known to the decoder 316. Each parity CB $P_j$, 1≤j≤N, is computed by performing an XOR of the m information CBs or cyclic shifts thereof. In some embodiments, each parity CB is computed as an XOR of m words, and each one of the m words is either equal to or a cyclic shift of a respective different one of the m information CBs. In some embodiments, the cyclic shift applied to an information CB $C_i$ to compute a parity CB $P_j$ is different from the cyclic shift applied to that information CB $C_i$ to compute every other parity CB $P_{h \neq j}$. In some embodiments, the relative cyclic shift of any combination of two information CBs is different for generating each different parity CB. In some embodiments, for a given pair of information CBs $C_a$ and $C_b$ used in generating each one of the parity CBs, the cyclic shift applied to $C_b$ in comparison to the cyclic shift applied to $C_a$ to generate one of the parity CBs is different from the cyclic shift applied to $C_b$ in comparison to the cyclic shift applied to $C_a$ to generate another one of the parity CBs. In some embodiments, for a given pair of information CBs $C_a$ and $C_b$ used in generating each one of the parity CBs, the difference between the cyclic shift value applied to $C_b$ and the cyclic shift value applied to $C_a$ to generate one of the parity CBs is different from the difference between the cyclic shift value applied to $C_b$ and the cyclic shift value applied to $C_a$ to generate every other one of the parity CBs. In some embodiments, for each parity CB $P_j$, 1≤j≤N: the cyclic shift applied to each information CB $C_i$, 1≤i≤m to compute parity CB $P_j$ is a function of j and i. In some embodiments, for each parity CB $P_j$, 1≤j≤N: the cyclic shift applied to each information CB $C_i$, 1≤i≤m to compute parity CB $P_j$ is based on a function of j multiplied by a function of i. In some embodiments, for each one of the N parity CBs: the cyclic shift applied to each one of the m information CBs, if any, to compute that parity CB, is a function of which one of the m information CBs is being cyclically shifted multiplied by which parity CB is being computed. Equation 1 satisfies all of these embodiments. For example, the term $C_i^{((j-1)*(i-1))}$ in Equation 1 is an example of the cyclic shift to apply $((j-1)*(i-1))$ being a function of which one i of the m information CBs is being cyclically shifted multiplied by which parity CB j is being computed. In Equation 1, because of the presence of $(j-1)*(i-1)$, for a given pair of information CBs $C_a$ and $C_b$ used in generating each one of the parity CBs, the cyclic shift applied to $C_b$ in comparison to the cyclic shift applied to $C_a$ to generate one of the parity CBs is different from the cyclic shift applied to $C_b$ in comparison to the cyclic shift applied to $C_a$ to generate every other one of the parity CBs.

In step 368 of FIG. 12, or in step 386 of FIG. 13, or in any other method in which N parity CBs are to be computed by encoder 310, then the computing method described above may be used. For example, Equation 1 may be used, or an alternative method satisfying the general principles discussed above may be used.

Figure 16:
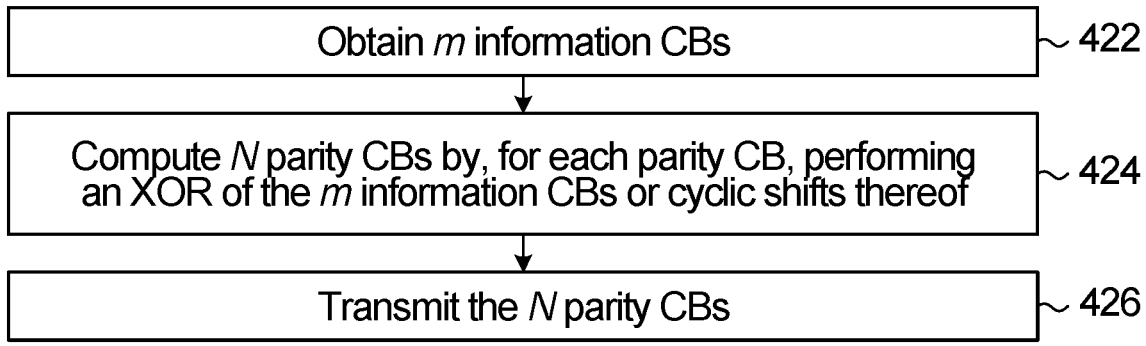
FIG. 16 illustrates an example method performed by a first network device.

More generally, FIG. 16 illustrates a method performed by the first network device 302, according to one embodiment. In step 422, the encoder 310 obtains m information CBs. In step 424, the encoder 310 computes N parity CBs from the m information CBs by, for each parity CB, performing an XOR of the m information CBs or cyclic shifts thereof. Equation 1 or an alternative method satisfying the general principles discussed above may be used to compute the N parity CBs. In step 426, the first network device transmits the N parity CBs to be used by the decoder 316 of the second network device 302.

Recovering Failed Information CBs at the Decoder

Decoding of the N failed information CBs using the received N parity CBs will now be described.

Remove the known information CBs:

Each parity CB $P_j$, $1 \leq j \leq N$, is a function of all m of the information CBs. An example will now be considered, in which m–N of the information CBs were correctly decoded, and these correctly decoded information CBs are known by the decoder 316. The N parity CBs $P_1$ to $P_N$ are therefore modified to remove the effect of the correctly decoded information CBs. The decoder 316 removes the effect of each known information CB from each parity CB by XORing the parity CB with the known information CB or with the cyclic shifted version of the known information CB that was used to generate the parity CB. The result is a set of N modified parity CBs $\tilde{P}_1$ to $\tilde{P}_N$, which are represented as:

$$\tilde{P}_j = C_{i_1}^{((j-1)*(i_1-1))} \ldots \oplus C_{i_t}^{((j-1)*(i_t-1))} \ldots \oplus C_{i_N}^{((j-1)*(i_N-1))} = \Sigma_{t=1}^{N} C_{i_t}^{((j-1)*(i_t-1))} \quad \text{(Equation 3)}$$

where $1 \leq j \leq N$, and where $i_t$ represents the t-th failed information CB. For example, if m=7 CBs were transmitted, and if CBs $C_3$, $C_5$, and $C_6$ were correctly decoded, and therefore CBs $C_1$, $C_2$, $C_4$, and $C_7$ failed, then N=4 and in Equation 3: $i_1=1$, $i_2=2$, $i_3=4$, and $i_4=7$.

In the example introduced in FIG. 14, the first three information CBs $C_1$, $C_2$, and $C_3$ failed and so N=3 and $i_1=1$, $i_2=2$, and $i_3=3$. Removing the effect of the correctly decoded information CBs removes the effect of correctly decoded information CB $C_4$. The modified parity CBs $\tilde{P}_1$ to $\tilde{P}_3$ are computed as follows:

$$\tilde{P}_1 = P_1 \oplus C_4 = (C_1 \oplus C_2 \oplus C_3 \oplus C_4) \oplus C_4 = C_1 \oplus C_2 \oplus C_3$$

$$\tilde{P}_2 = P_2 \oplus C_4^{(3)} = (C_1 \oplus C_2^{(1)} \oplus C_3^{(2)} \oplus C_4^{(3)}) \oplus C_4^{(3)} = C_1 \oplus C_2^{(1)} \oplus C_3^{(2)}$$

$$\tilde{P}_3 = P_3 \oplus C_4^{(6)} = (C_1 \oplus C_2^{(2)} \oplus C_3^{(4)} \oplus C_4^{(6)}) \oplus C_4^{(6)} = C_1 \oplus C_2^{(2)} \oplus C_3^{(4)}$$

Decode using the modified parity CBs $\tilde{P}_1$ to $\tilde{P}_3$:

To decode the incorrectly decoded information CBs using the modified parity CBs, the decoder 316 executes a recursive decoding function that invokes itself, as explained in detail below. The operation and execution of the decoding function is based on the following observations.

N–1 new parity CBs $Q_1$ to $Q_{N-1}$ can be computed from the parity CBs $\tilde{P}_1$ to $\tilde{P}_N$ such that the effect of first incorrectly decoded information CB $C_{i_1}$ is removed via Gaussian Elimination. In one embodiment, the N–1 new parity CBs can be computed as follows:

$$Q_j = \tilde{P}_j^{-((j-1)*(i_1-1))} \oplus \tilde{P}_{j+1}^{-(j*(i_1-1))}, \quad 1 \leq j \leq N-1 \quad \text{(Equation 4)}$$

where $\tilde{P}_j^{-((j-1)*(i_1-1))}$ is $\tilde{P}_j$ right cyclic shifted by $(j-1)*(i_1-1)$, and $\tilde{P}_{j+1}^{-(j*(i_1-1))}$ is $\tilde{P}_{j+1}$ right cyclic shifted by $j*(i_1-1)$. A right cyclic shift of an element l of $\tilde{P}_j$ by x positions is defined as $\tilde{P}_{j,l}^{-(x)} = \tilde{P}_{j,(l-x) \mod k}$. The right cyclic shift of the parity CBs inverses the left cyclic shifting performed by the encoder 310 to generate the parity CBs, and causes the elements having codeword $C_{i_1}$ to align and be XORed together to eliminate the effect of codeword $C_{i_1}$. As per Equation 1 above, codeword $C_{i_1}$ was cyclic shifted by $(j-1)*(i_1-1)$ to generate the parity CB $\tilde{P}_j$ and so a corresponding cyclic shift in the opposite direction is performed to align the elements including $C_{i_1}$ in adjacent parity CBs, so that $C_{i_1}$ will be XORed with itself when adjacent parity CBs are XORed. XORing $C_{i_1}$ with itself removes the effect of $C_{i_1}$ from $Q_j$.

Note that $$\tilde{P}_j^{-((j-1)*(i_1-1))} = C_{i_1}^{0} \ldots \oplus C_{i_t}^{((j-1)*(i_t-i_1))} \ldots \oplus C_{i_N}^{((j-1)*(i_N-i_1))} = \Sigma_{t=1}^{N} C_{i_t}^{((j-1)*(i_t-i_1))}$$

and so $Q_j$ may be alternatively expressed as $$Q_j \tilde{P}_j^{-((j-1)*(i_1-1))} \oplus \tilde{P}_{j-1}^{-(j*(i_1-1))} = \Sigma_{t=1}^{N} (C_{i_t}^{((j-1)*(i_t-i_1))} \oplus C_{i_t}^{(j*(i_t-i_1))}), 1 \leq j \leq N-1$$

Alternatively, $Q_j$ may be expressed as $$Q_j = \Sigma_{t=1}^{N-1} (C_{i_{t+1}}^{((j-1)*(i_{t+1}-i_1))} \oplus C_{i_{t+1}}^{((j)*(i_{t+1}-i_1))}), 1 \leq j \leq N-1.$$

N–1 information CBs $D_1$ to $D_{N-1}$ corresponding to the parity CBs $Q_1$ to $Q_{N-1}$ may be defined as follows:

$$D_t = C_{i_{t+1}}^{(0)} \oplus C_{i_{t+1}}^{((i_{t+1}-i_1))}, 1 \leq t \leq N-1 \quad \text{(Equatin 5)}$$

Note that the information CB $D_t$ is defined as original failed information CB $C_{i_{t+1}}$ XORed with a version of $C_{i_{t+1}}$ that is left cyclic shifted by $i_{t+1}-i_1$. In the example introduced in relation to FIG. 14, $D_1 = C_2^{(0)} \oplus C_2^{((2-1))} = C_2^{(0)} \oplus C_2^{(1)}$, and $D_2 = C_3^{(0)} \oplus C_3^{((3-1))} = C_3^{(0)} \oplus C_3^{(2)}$.

If $D_t$ is defined as per Equation 5, then $D_t$ left cyclic shifted by $(j-1)*(i_{t+1}-i_1)$ is $D_t^{(j-1)*(i_{t+1}-i_1)} = C_{i_{t+1}}^{((j-1)*(i_{t+1}-i_1))} \oplus C_{i_{t+1}}^{((j)*(i_{t+1}-i_1))}$.

$Q_j$ may therefore be expressed as:

$$Q_j = \Sigma_{t=1}^{N-1} D_t^{((j-1)*(i_{t+1}-i_1))}, 1 \leq j \leq N-1 \quad \text{(Equation 6)}$$

Note that Equation 6 is the same format as Equation 3, but with one less dimension: there are N–1 unknown information CBs $D_1$ to $D_{N-i}$, which are to be determined using N–1 known parity CBs $Q_1$ to $Q_{N-1}$. The input of Equation 3 is dimension N, parity CBs $P_j, 1 \leq j \leq N$, and CB index $i_t$, and the output to be computed is $C_{i_1}$ to $C_{i_t}$. Whereas, Equation 6 is Equation 3 with input dimension N–1, input parity CBs $Q_j, 1 \leq j \leq N-1$, and CB index $i_{t+1}-i_1+1$, and the output to be computed is $D_1$ to $D_{N-1}$.

A decoding function may therefore be defined and recursively executed by the decoder 316 based on Equation 3. The input of the decoding function is: Dimension, CB_index, and PCBs. The output is decoded values ICBs corresponding to the input PCBs.

The decoding function is executed as follows:
Function=DecodeOuterCode
Inputs: (1) Dimension, (2) CB_index (3) input parity CBs (PCBs) equal in number to Dimension.
Outputs: decoded values (ICBs) corresponding to the input parity CBs.
Step 1: Define variables:
N=Dimension,
$i_t$=CB_index,
$\tilde{P}_1$ to $\tilde{P}_N$ =the input PCBs.
$\tilde{C}_1$ to $\tilde{C}_N$ =the output information CBs (ICBs), which corresponds to $C_{i_1}$ to $C_{i_t}$ in Equation 3.
According to equation 3, the relationship between the input and output of this recursive function is given by $$\tilde{P}_j = \sum_{t=1}^{N} \tilde{C}_t^{(j-1)*(i_t-1)} \quad \text{(Equation 3A)}$$

Step 2: If N=1, then terminate the function and output information CB $C_1 = \tilde{P}_1$. Otherwise proceed to:
Step 3: Compute Equation 4: $Q_j = \tilde{P}_j^{-(j-1)*(i_1-1)} \oplus \tilde{P}_{j+1}^{-(j*(i_1-1))}, 1 \leq j \leq N-1$
Step 4: Execute DecodeOuterCode with inputs (1) Dimension=N-1, (2) $CB_{index}=i_{t+1}-i_1+1$ (3) PCBs=$Q_1$ to $Q_{N-1}$ computed in Step 3. The output information CB of the DecoderOuterCode with dimension N-1 in Step 4 is noted as $D_1$ to $D_{N-1}$. The relationship between the output $D_1$ to $D_{N-1}$ and the input PCBs are given by Equation 6

$$Q_j = \sum_{t=1}^{N-1} D_t^{(j-1)*(i_{t+1}-i_1)}, 1 \leq j \leq N-1 \quad \text{(Equation 6)}$$

Step 5: Use the output of DecodeOuterCode in step 4, i.e. the information CBs from the previous dimension, i.e., $D_1$ to $D_{N-1}$, to compute information CBs $\tilde{C}_2$ to $\tilde{C}_N$ in the present dimension. In some embodiments, Step 5 utilizes the relationship of Equation 5.

$$D_t = C_{i_{t+1}}^{(0)} \oplus C_{i_t}^{((i_{t+1}-i_t))} = \tilde{C}_{t+1}^{(0)} \oplus \tilde{C}_{t+1}^{((i_{t+1}-i_1))}, \quad 1 \leq t \leq N-1 \quad \text{(Equatin 5A)}$$

Specifically, a particular information CB $D_t$ from the previous dimension that is output in step 4 is related to information CB $\tilde{C}_{t+1}$ of the current dimension as in Equation 5A. In one embodiment, the decoder 316 first considers $\tilde{C}_{t+1,0}$ as known by setting $\tilde{C}_{t+1,0}=0$. The other values of $\tilde{C}_{t+1}$ are then computed given $D_t$, given $\tilde{C}_{t+1,0}=0$ and given $D_t = \tilde{C}_{t+1}^{(0)} \oplus \tilde{C}_{t+1}^{((i_{t+1}-i_1))}$. For notational simplicity, define $a=i_{t+1}-i_1$. Then this step can be achieved by $\tilde{C}_{t+1,(a \bmod k)} = D_{t,0} \oplus \tilde{C}_{t+1,(2a \bmod k)} = D_{t,(a \bmod k)} \oplus \tilde{C}_{t+1, (a \bmod k)}; \cdots$, until $\tilde{C}_{t+1,((k-1)*a \bmod k)} = D_{t,((k-2)*a \bmod k)} \oplus \tilde{C}_{t+1,((k-2)*a \bmod k)}$, k being a prime number can ensure that all the elements of $\tilde{C}_{t+1}$ can be derived using this way. The CRC of computed $\tilde{C}_{t+1}^{(0)}$ is then checked. If the CRC check fails, then the decoder instead sets $\tilde{C}_{t+1,0}=1$ and the other values of $\tilde{C}_{t+1}$ are then recomputed in the same way. In an alternative embodiment, if the CRC fails, another way is to flip the bits of all elements of $\tilde{C}_{t+1}$ obtained from setting the first element to 0. In an alternative embodiment, the decoder may first set $\tilde{C}_{t+1}=1$, instead of $\tilde{C}_{t+1}=0$, and then repeat the calculations with $\tilde{C}_{t+1}=0$ only if the CRC check fails for $\tilde{C}_{t+1}=1$.

Step 6: Use $\tilde{C}_2$ to $\tilde{C}_N$ to compute $\tilde{C}_1$. $D_1$ may be computed using (i) one or more of the parity CBs computed in the previous step, and (ii) the known relationship between the parity CBs and information CBs, e.g. from Equation 3A $\tilde{P}_j = \sum_{t=1}^{N} \tilde{C}_t$ where all variables are known except $\tilde{C}_1$.

Step 7: Output information ICBs $\tilde{C}_1$ to $\tilde{C}_N$, which correspond to the input parity CBs.

In the general recursion function above, note that unlike the original information CBs $C_i$, the CBs $D_i$ do not have their own CRC. Therefore, the correctness of decoding a $D_i$ may not be able to be checked right away. In one embodiment, the method to deal with this is to keep the different possibilities of D's output that correspond to setting the first element in D to 0 and 1 respectively. After the point is reached that all the possibilities of original information CBs can be output, each possibility will be verified by the CRC of the original information CBs and only one correct possible output can be verified by the CRC, and all other possibilities are discarded.

To assist in understanding, the operation of the decoding recursion function above will be explained for the example introduced in relation to FIG. 14, i.e. N=3 parity CBs $\tilde{P}_1$ to $\tilde{P}_3$, k=5, and $i_1=1$, $i_2=2$, and $i_3=3$.

DecodeOuterCode is first invoked, i.e. called, with inputs Dimension=N=3 and parity CBs (PCBs) $\tilde{P}_1$ to $\tilde{P}_3$. Invoking DecodeOuterCode with inputs Dimension=N=3 and parity CBs (PCBs) $\tilde{P}_1$ to $\tilde{P}_3$ will be referred to as "the recursion of the decoding function for N=3".

In the recursion of the decoding function for N=3, N≠1 and so step 3 is executed: $Q_j = \tilde{P}_j^{-(j-1)*(i_1-1)} \oplus \tilde{P}_{j+1}^{-(j*(i_1-1))}$, $1 \leq j \leq 2$, which results in Gaussian elimination of information CB $C_1$. Specifically, executing Equation 4 results in $Q_1$ and $Q_2$, which are computed as follows:

$$Q_1 = \tilde{P}_1^{-((1-1)*(1-1))} \oplus \tilde{P}_2^{-(1*(1'1))} = \tilde{P}_1 \oplus \tilde{P}_2$$

$$Q_2 = \tilde{P}_2^{-((2-1)*(1-))} \oplus \tilde{P}_3^{-(2*(1-1))} = \tilde{P}_2 \oplus \tilde{P}_3$$

Note that on an element-by-element basis:

$$Q_1 = \tilde{P}_1 \oplus \tilde{P}_2$$
$$= \{Q_{1,0}, Q_{1,1}, Q_{1,2}, Q_{1,3}, Q_{1,4}\}$$
$$= \{\tilde{P}_{1,0} \oplus \tilde{P}_{2,0}, \tilde{P}_{1,1} \oplus \tilde{P}_{2,1}, \tilde{P}_{1,2} \oplus \tilde{P}_{2,2}, \tilde{P}_{1,3} \oplus \tilde{P}_{2,3}, \tilde{P}_{1,4} \oplus \tilde{P}_{2,4}\}$$

That is, $Q_{1,0} = \tilde{P}_{1,0} \oplus \tilde{P}_{2,0}, \ldots, Q_{1,4} = \tilde{P}_{1,4} \oplus \tilde{P}_{2,4}$.

$$Q_2 = \tilde{P}_2 \oplus \tilde{P}_3$$
$$= \{Q_{2,0}, Q_{2,1}, Q_{2,2}, Q_{2,3}, Q_{2,4}\}$$
$$= \{\tilde{P}_{2,0} \oplus \tilde{P}_{3,0}, \tilde{P}_{2,1} \oplus \tilde{P}_{3,1}, \tilde{P}_{2,2} \oplus \tilde{P}_{3,2}, \tilde{P}_{2,3} \oplus \tilde{P}_{3,3}, \tilde{P}_{2,4} \oplus \tilde{P}_{3,4}\}.$$

That is, $Q_{2,0} = \tilde{P}_{2,0} \oplus \tilde{P}_{3,0}, \ldots, Q_{2,4} = \tilde{P}_{2,4} \oplus \tilde{P}_{3,4}$.
Note that $$D_1 = C_2 \oplus C_2^{(1)}$$
$$D_2 = C_3 \oplus C_3^{(2)}$$

$$Q_1 = \tilde{P}_1 \oplus \tilde{P}_2$$
$$= (C_1 \oplus C_2 \oplus C_3) \oplus (C_1 \oplus C_2^{(1)} \oplus C_3^{(2)})$$
$$= (C_2 \oplus C_2^{(1)}) \oplus (C_3 \oplus C_3^{(2)})$$
$$= D_1 \oplus D_2$$

$$Q_2 = \tilde{P}_2 \oplus \tilde{P}_3$$
$$= (C_1 \oplus C_2^{(1)} \oplus C_3^{(2)}) \oplus (C_1 \oplus C_2^{(2)} \oplus C_3^{(4)})$$
$$= (C_2^{(1)} \oplus C_2^{(2)}) \oplus (C_3^{(2)} \oplus C_3^{(4)})$$
$$= D_1^{(1)} \oplus D_2^{(2)}.$$

This is consistent with the representation in Equation 6: $Q_j = \sum_{t=1}^{N-1} D_t^{((j-1)*(i_{t+1}-i_1))}$ and so $Q_1 = \sum_{t=1}^{2} d_t^{((1-1)*(t+1-))} = D_1 \oplus D_2$ and $Q_2 = \sum_{t=1}^{2} D_t^{((2-1)*(t+1-))} = D_1^{(1)} \oplus D_2^{(2)}$. The effect of information CB $C_1$ has been eliminated through the Gaussian elimination.

In step 4 of the recursion of the decoding function for N=3, the decoding function DecodeOuterCode is again invoked, but now with inputs Dimension=N=2 and input parity CBs $Q_1$ and $Q_2$. Invoking DecodeOuterCode with inputs Dimension=N=2 and parity CBs (PCBs) $Q_1$ to $Q_2$ will be referred to as "the recursion of the decoding function for N=2".

In the recursion of the decoding function for N=2, N≠1 and so step 3 is executed: $Q'_j = Q_j^{-((j-1)*(i_1-1))} \oplus Q_{j+1}^{-(j*(i_1-1))}$, 1≤j≤1. Specifically, this results in a single $Q'_1$ which is computed as follows: $Q'_1 = Q_1 \oplus Q_2$.

In step 4 of the recursion of the decoding function for N=2, the decoding function DecodeOuterCode is again invoked, but now with inputs Dimension=N=1 and input parity CB $Q'_1$. Invoking DecodeOuterCode with inputs Dimension=N=1 and parity CB $Q'_1$ will be referred to as "the recursion of the decoding function for N=1".

In the recursion of the decoding function for N=1, it terminates at step 2 and outputs information CB $D'_1 = Q'_1$.

Returning to the recursion of the decoding function for N=2, step 5 may now proceed because step 4 has completed and returned $D'_1$. In step 5, the information CB $D'_1$ is used to compute $D_2$. As per Equation 5: $D'_1 = D_2^{(0)} \oplus D_2^{(1)}$. To compute $D_2$, the decoder 316 first considers $D_{2,0}$ as known by setting $D_{2,0} = 0$. The other values of $D_2$ are then computed as: $D_{2,1} = D_{2,0} \oplus D'_{1,0}$, $D_{2,2} = D_{2,1} \oplus D'_{1,1}$, ..., $D_{2,k-1} = D_{2,k-2} \oplus D'_{1,k-2}$. The CRC of $D_2$ is then checked. If the CRC check fails, then the decoder instead sets $D_{2,0} = 1$ and the other values of $D_2$ are then recomputed in the same way. Note that unlike the original information CBs, $C_1$, $C_2$ and $C_3$, $D_1$, $D_2$ does not have its own CRC. Therefore, the correctness of decoding $D_1$, $D_2$ may not be able to be checked right away. The method to deal with this is to keep the two possibilities of $D_1$, $D_2$ output that correspond to $D_{2,0} = 0$ and $D_{2,0} = 1$, respectively. After the point is reached that all the possibilities of original information CBs can be output, each possibility will be verified by the CRC of the original information CBs and only one correct possible output can be verified by the CRC and all other possibilities are discarded. In this example, there are two possible output of $D_1$ and $D_2$, which corresponds to four possible output for each original CBs before CRC check. After CRC check, only the correct decoder output remains.

Step 6 of the recursion of the decoding function for N=2 may now be performed, which consists of using $D_2$ to compute $D_1$. Using the parity equation $Q_1 = D_1 \oplus D_2$, then $D_1$ may be easily computed, e.g. by an XOR operation, because $Q_1$ and $D_2$ are known.

Step 7 of the recursion of the decoding function for N=2 is to output $D_1$ and $D_2$.

Returning to the recursion of the decoding function for N=3, step 5 may now proceed because step 4 has completed and returned $D_1$ and $D_2$. In step 5, the information CBs $D_1$ and $D_2$ are used to compute $C_2$ and $C_3$.

To compute $C_2$, the relationship $D_1 = C_2 \oplus C_2^{(1)}$ is utilized. The decoder 316 first considers $C_{2,0}$ as known by setting $C_{2,0} = 0$. The other values of $C_2$ are then computed as: $C_{2,1} = C_{2,0} \oplus D_{1,0}$, $C_{2,2} = C_{2,1} \oplus D_{1,1}$, ..., $C_{2,4} = C_{2,3} \oplus D_{1,3}$. The CRC of computed $C_2$ is then checked. If the CRC check fails, then the decoder instead sets $C_{2,0} = 1$ and the other values of $C_2$ are then recomputed in the same way.

To compute $C_3$, the relationship $D_2 = C_3 \oplus C3^{(2)}$ is utilized. The decoder 316 first considers $C_{3,0}$ as known by setting $C_{3,0} = 0$. The other values of $C_3$ are then computed as: $C_{3,2} = C_{3,0} \oplus D_{2,0}$, $C_{3,4} = C_{3,2} \oplus D_{2,2}$, $C_{3,1} = C_{3,4} \oplus D_{2,4}$, and $C_{3,3} = C_{3,1} \oplus D_{2,1}$. The CRC of computed $C_3$ is then checked. If the CRC check fails, then the decoder instead sets $C_{3,0} = 1$ and the other values of $C_3$ are then recomputed in the same way. Note that there are two possibilities of $D_1$ and, $D_2$ from the above step, then both possible outputs should be used here to compute the corresponding original information blocks $C_2$ and $C_3$ until CRC is checked and the wrong possible outputs are then removed.

Step 6 of the recursion of the decoding function for N=3 may now be performed, which consists of using $C_2$ and $C_3$ to compute $C_1$. Using the parity equation $\tilde{P}_1 = C_1 \oplus C_2 \oplus C_3$, then $C_1$ may be easily computed, e.g. by XOR operations, because $C_2$ and $C_3$ are known.

Step 7 of the recursion of the decoding function for N=3 is to output $C_1$, $C_2$, and $C_3$. Decoding is complete.

Figure 17:
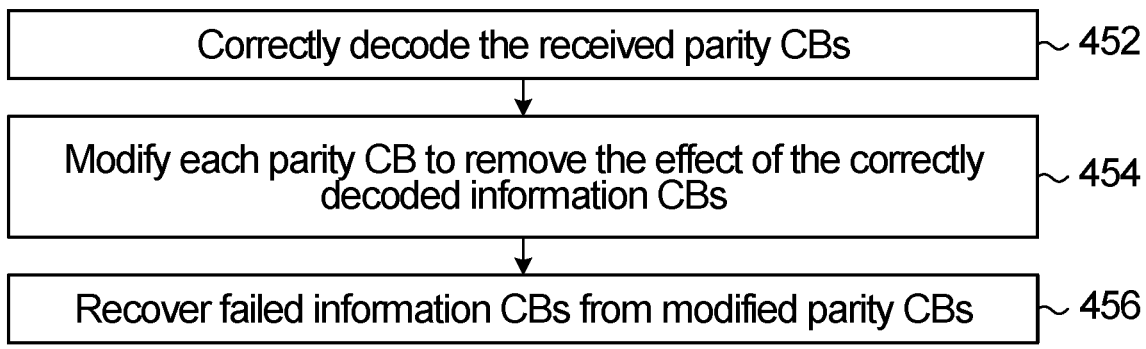
FIG. 17 illustrates an example method performed by a second network device.

FIG. 17 is an example method performed by the second network device 304. In step 452, the second network device 304 receives and correctly decodes the inner code of N parity CBs. In step 454, the decoder 316 modifies each of the parity CBs to remove the effect of the correctly decoded information CBs and thereby obtains modified parity CBs.

In some embodiments, step 454 comprises, for each parity CB $P_j$, XORing $P_j$ with a correctly decoded information CB $C_i$ that is cyclic shifted by an amount equal to the amount the information CB $C_i$ was shifted to generate $P_j$ at the encoder.

In step 456, the decoder recovers the failed information CBs using the modified parity CBs.

In some embodiments, step 456 comprises recursively calling a decoding function, wherein in each of a plurality of recursions of the decoding function, pairs of input parity CBs are cyclic shifted and XOR'd to remove the effect of one information CB. In some embodiments, the cyclic shift respectively applied to each input parity CB of a pair of input parity CBs is to inverse cyclic shifting applied by the encoder. In some embodiments, the cyclic shift respectively applied each input parity CB of the pair of input parity CBs is to align elements including the information CB to be removed, so that XORing of the pair of input parity CBs cancels the effect of the information CB. In some embodiments, the output of one recursion of the decoding function is used to generate the output of another recursion of the decoding function, with the final output being the decoded information CBs. In some embodiments, the output of one recursion of the decoding function comprises a CB D, and another CB $C_{i_{t+1}}$ is determined using D. In some embodiments, determining CB $C_{i_{t+1}}$ using D comprises: an element of $C_{i_{t+1}}$ is set to either 0 or 1, and the rest of the elements of $C_{i_{t+1}}$ are determined. In some embodiments, a CRC check for $C_{i_{t+1}}$ is then performed, and if the CRC check fails, then the element of $C_{i_{t+1}}$ that is set to either 0 or 1 is instead set to the opposite value.

A Few Other Decoding Examples

Another example is provided below, which is the same as the example introduced in relation to FIG. 14, but the failed information CBs are instead $C_1$, $C_2$, and $C_4$. The output of step 452 is:

$\tilde{P}_j = C_1^{(0)} \oplus C_2^{((j-1)*1)} \oplus C_4^{((j-1)*3)}$, which on an element by element basis is:

$\tilde{P}_{1,0} = C_{1,0} \oplus C_{2,0} \oplus C_{4,0}$; $\tilde{P}_{2,0} = C_{1,0} \oplus C_{2,1} \oplus C_{4,3}$; $\tilde{P}_{3,0} = C_{1,0} \oplus C_{2,2} \oplus C_{4,1}$ $\tilde{P}_{1,1} = C_{1,1} \oplus C_{2,1} \oplus C_{4,1}$; $\tilde{P}_{2,1} = C_{1,1} \oplus C_{2,2} \oplus C_{4,4}$; $\tilde{P}_{3,1} = C_{1,1} \oplus C_{2,3} \oplus C_{4,2}$ $\widetilde{P_{1,2}} = C_{1,2} \oplus C_{2,2} \oplus C_{4,2}$; $\widetilde{P_{2,2}} = C_{1,2} \oplus C_{2,3} \oplus C_{4,0}$; $\widetilde{P_{3,2}} = C_{1,2} \oplus C_{2,4} \oplus C_{4,3}$
$\widetilde{P_{1,3}} = C_{1,3} \oplus C_{2,3} \oplus C_{4,3}$; $\widetilde{P_{2,3}} = C_{1,3} \oplus C_{2,4} \oplus C_{4,1}$; $\widetilde{P_{3,3}} = C_{1,3} \oplus C_{2,0} \oplus C_{4,4}$
$\widetilde{P_{1,4}} = C_{1,4} \oplus C_{2,4} \oplus C_{4,4}$; $\widetilde{P_{2,4}} = C_{1,4} \oplus C_{2,0} \oplus C_{4,2}$; $\widetilde{P_{3,4}} = C_{1,4} \oplus C_{2,1} \oplus C_{4,0}$ $D_2$ is as follows:

$$D_2 = C_4 \oplus C_4^{(3)}$$
$$= \{D_{2,0}, D_{2,1}, D_{2,2}, D_{2,3}, D_{2,4}\}$$
$$= \{C_{4,0} \oplus C_{4,0}^{(3)}, C_{4,1} \oplus C_{4,1}^{(3)}, C_{4,2} \oplus C_{4,2}^{(3)}, C_{4,3} \oplus C_{4,3}^{(3)}, C_{4,4} \oplus C_{4,4}^{(3)}\}$$
$$= \{C_{4,0} \oplus C_{4,3}, C_{4,1} \oplus C_{4,4}, C_{4,2} \oplus C_{4,0}, C_{4,3} \oplus C_{4,1}, C_{4,4} \oplus C_{4,2}\}.$$

That is, $D_{2,0} = C_{4,0} \oplus C_{4,3}$, $D_{2,1} = C_{4,1} \oplus C_{4,4}$, ..., $D_{2,4} = C_{4,4} \oplus C_{4,2}$.

The elements of $Q_1$ and $Q_2$ are as follows:

$$Q_{1,0} = D_{1,0} \oplus D_{2,0} \quad Q_{2,0} = D_{1,1} \oplus D_{2,3}$$
$$Q_{1,1} = D_{1,1} \oplus D_{2,1} \quad Q_{2,1} = D_{1,2} \oplus D_{2,4}$$
$$Q_{1,2} = D_{1,2} \oplus D_{2,2} \quad Q_{2,2} = D_{1,3} \oplus D_{2,0}$$
$$Q_{1,3} = D_{1,3} \oplus D_{2,3} \quad Q_{2,3} = D_{1,4} \oplus D_{2,1}$$
$$Q_{1,4} = D_{1,4} \oplus D_{2,4} \quad Q_{2,4} = D_{1,0} \oplus D_{2,2}$$

Another example is provided below, which is the same as the example introduced in relation to FIG. 14, but the failed information CBs are instead $C_1$, $C_3$, and $C_4$. The output of step 452 is:
$P_j = C_1^{(0)} \oplus C_3^{((j-1)*2)} \oplus C_{4,l}^{((j-1)*3)}$, which on an element-by-element basis is:

$\widetilde{P_{1,0}} = C_{1,0} \oplus C_{3,0} \oplus C_{4,0}$; $\widetilde{P_{2,0}} = C_{1,0} \oplus C_{3,2} \oplus C_{4,3}$; $\widetilde{P_{3,0}} = C_{1,0} \oplus C_{3,4} \oplus C_{4,1}$
$\widetilde{P_{1,1}} = C_{1,1} \oplus C_{3,1} \oplus C_{4,1}$; $\widetilde{P_{2,1}} = C_{1,1} \oplus C_{3,3} \oplus C_{4,4}$; $\widetilde{P_{3,1}} = C_{1,1} \oplus C_{3,0} \oplus C_{4,2}$
$\widetilde{P_{1,2}} = C_{1,2} \oplus C_{3,2} \oplus C_{4,2}$; $\widetilde{P_{2,2}} = C_{1,2} \oplus C_{3,4} \oplus C_{4,0}$; $\widetilde{P_{3,2}} = C_{1,2} \oplus C_{3,1} \oplus C_{4,3}$
$\widetilde{P_{1,3}} = C_{1,3} \oplus C_{3,3} \oplus C_{4,3}$; $\widetilde{P_{2,3}} = C_{1,3} \oplus C_{3,0} \oplus C_{4,6}$; $\widetilde{P_{3,2}} = C_{1,3} \oplus C_{3,2} \oplus C_{4,4}$
$\widetilde{P_{1,4}} = C_{1,4} \oplus C_{3,4} \oplus C_{4,4}$; $\widetilde{P_{2,4}} = C_{1,4} \oplus C_{3,1} \oplus C_{4,2}$; $\widetilde{P_{3,4}} = C_{1,4} \oplus C_{3,3} \oplus C_{4,0}$ $D_1$ is as follows:

$$D_1 = C_3 \oplus C_3^{(2)}$$
$$= \{D_{1,0}, D_{1,1}, D_{1,2}, D_{1,3}, D_{1,4}\}$$
$$= \{C_{3,0} \oplus C_{3,0}^{(2)}, C_{3,1} \oplus C_{3,1}^{(2)}, C_{3,2} \oplus C_{3,2}^{(2)}, C_{3,3} \oplus C_{3,3}^{(2)}, C_{3,4} \oplus C_{3,4}^{(2)}\}$$
$$= \{C_{3,0} \oplus C_{3,2}, C_{3,1} \oplus C_{3,3}, C_{3,2} \oplus C_{3,4}, C_{3,3} \oplus C_{3,0}, C_{3,4} \oplus C_{3,1}\}$$

That is, $D_{1,0} = C_{3,0} \oplus C_{3,2}$, $D_{1,1} = C_{3,1} \oplus C_{3,3}$, ..., $D_{1,4} = C_{3,4} \oplus C_{3,1}$.

$D_2$ is as follows:

$$D_2 = C_4 \oplus C_4^{(3)}$$
$$= \{D_{2,0}, D_{2,1}, D_{2,2}, D_{2,3}, D_{2,4}\}$$
$$= \{C_{4,0} \oplus C_{4,0}^{(3)}, C_{4,1} \oplus C_{4,1}^{(3)}, C_{4,2} \oplus C_{4,2}^{(3)}, C_{4,3} \oplus C_{4,3}^{(3)}, C_{4,4} \oplus C_{4,4}^{(3)}\}$$
$$= \{C_{4,0} \oplus C_{4,3}, C_{4,1} \oplus C_{4,4}, C_{4,2} \oplus C_{4,0}, C_{4,3} \oplus C_{4,1}, C_{4,4} \oplus C_{4,2}\}.$$

That is, $D_{2,0} = C_{4,0} \oplus C_{4,3}$, $D_{2,1} = C4,1 \oplus BC_{4,4}$ ..., $D_{2,4} = C_{4,4} \oplus C_{4,2}$.

Another example is provided below, which is the same as the example introduced in relation to FIG. 14, but the failed information CBs are instead $C_2$, $C_3$, and $C_4$. The output of step 452 on an element-by-element basis is:

$\widetilde{P_{1,0}} = C_{2,0} \oplus C_{3,0} \oplus C_{4,0}$; $\widetilde{P_{2,0}} = C_{2,1} \oplus C_{3,2} \oplus C_{4,3}$; $\widetilde{P_{3,0}} = C_{2,2} \oplus C_{3,4} \oplus C_{4,1}$
$\widetilde{P_{1,1}} = C_{2,1} \oplus C_{3,1} \oplus C_{4,1}$; $\widetilde{P_{2,1}} = C_{2,2} \oplus C_{3,3} \oplus C_{4,4}$; $\widetilde{P_{3,1}} = C_{2,3} \oplus C_{3,0} \oplus C_{4,2}$
$\widetilde{P_{1,2}} = C_{2,2} \oplus C_{3,2} \oplus C_{4,2}$; $\widetilde{P_{2,2}} = C_{2,3} \oplus C_{3,4} \oplus C_{4,0}$; $\widetilde{P_{3,2}} = C_{2,4} \oplus C_{3,1} \oplus C_{4,3}$
$\widetilde{P_{1,3}} = C_{2,3} \oplus C_{3,3} \oplus C_{4,3}$; $\widetilde{P_{2,3}} = C_{2,4} \oplus C_{3,0} \oplus C_{4,1}$; $\widetilde{P_{3,3}} = C_{2,0} \oplus C_{3,2} \oplus C_{4,4}$
$\widetilde{P_{1,4}} = C_{2,4} \oplus C_{3,4} \oplus C_{4,4}$; $\widetilde{P_{2,4}} = C_{2,0} \oplus C_{3,1} \oplus C_{4,2}$; $\widetilde{P_{3,4}} = C_{2,1} \oplus C_{3,3} \oplus C_{4,0}$ Realigning the equations above for information CB $C_2$ Gaussian elimination:

$\widetilde{P_{1,0}} = C_{2,0} \oplus C_{3,0} \oplus C_{4,0}$; $\widetilde{P_{2,4}} = C_{2,0} \oplus C_{3,1} \oplus C_{4,2}$; $\widetilde{P_{3,3}} = C_{2,0} \oplus C_{3,2} \oplus C_{4,4}$
$\widetilde{P_{1,1}} = C_{2,1} \oplus C_{3,1} \oplus C_{4,1}$; $\widetilde{P_{2,0}} = C_{2,1} \oplus C_{3,2} \oplus C_{4,3}$; $\widetilde{P_{3,4}} = C_{2,1} \oplus C_{3,3} \oplus C_{4,0}$
$\widetilde{P_{1,2}} = C_{2,2} \oplus C_{3,2} \oplus C_{4,2}$; $\widetilde{P_{2,1}} = C_{2,2} \oplus C_{3,3} \oplus C_{4,4}$; $\widetilde{P_{3,0}} = C_{2,2} \oplus C_{3,4} \oplus C_{4,1}$
$\widetilde{P_{1,3}} = C_{2,3} \oplus C_{3,3} \oplus C_{4,3}$; $\widetilde{P_{2,2}} = C_{2,3} \oplus C_{3,4} \oplus C_{4,0}$; $\widetilde{P_{3,1}} = C_{2,3} \oplus C_{3,0} \oplus C_{4,2}$
$\widetilde{P_{1,4}} = C_{2,4} \oplus C_{3,4} \oplus C_{4,4}$; $\widetilde{P_{2,3}} = C_{2,4} \oplus C_{3,0} \oplus C_{4,1}$; $\widetilde{P_{3,2}} = C_{2,4} \oplus C_{3,1} \oplus C_{4,3}$ The decoding method may then proceed in the same way as in the example above where information CBs $C_1$, $C_2$, and $C_3$ fail.

Nested HARQ

In embodiments described above, the parity CBs are successfully decoded. However, there may be situations in which decoding of one or more of the parity CBs also fails. A nested HARQ method may therefore be performed when the decoding of one or more of the parity CBs fails.

In some embodiments, the nested HARQ method operates as follows. If a transmission is sent having N parity CBs, where $1 \leq N \leq m$, and decoding of one or more of the parity CBs fails, then the incorrectly decoded parity CBs may be recovered using the same method described above for recovering information CBs. Once the failed parity CBs are recovered, then the parity CBs may be used to recover the failed information CBs.

As one example, an initial transmission is sent from the first network device 302 to the second network device 304. The initial transmission includes m=7 information CBs $C_1$ to $C_7$. The decoder 316 incorrectly decodes N=3 of the information CBs. HARQ feedback is sent back to the first network device 302 indicating that N=3 information CBs failed. N=3 parity CBs $P_1$ to $P_3$ are therefore generated by the encoder 310 and sent to the second network device 304. The decoder 316 incorrectly decodes $N_1$=1 of the parity CBs. HARQ feedback is therefore sent back to the first network device 302 indicating that decoding failed for $N_1$=1 parity CBs. $N_1$=1 parity CB $P_1^1$ is generated by the encoder 310 using the outer code encoder with the parity CBs $P_1$ to $P_3$ as the input information CBs, in the manner described above, and sent to the second network device 304. The decoder correctly decodes parity CB $P_1^1$. Parity CB $P_1^1$ is used to recover the failed one of parity CBs $P_1$ to $P_3$. Parity CBs $P_1$ to $P_3$ are then used to recover the N=3 failed information CBs. Each outer encoding and outer decoding step in the example may be implemented in the manner discussed above. In one implementation, the encoder 310 computes $P_1^1$ as $P_1^1 = P_1 \oplus P_2 \oplus P_3$.

Figure 18:
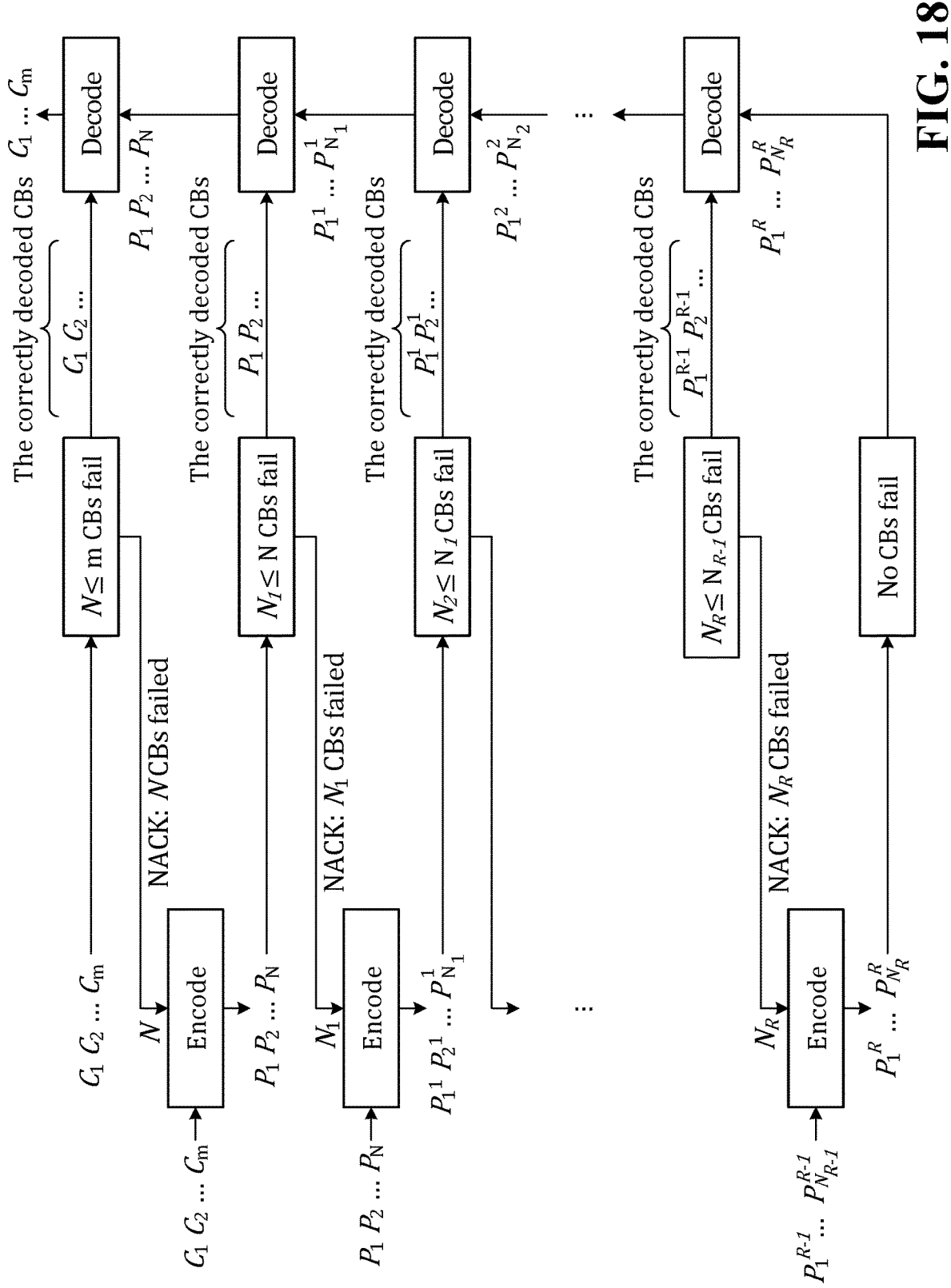
FIGS. 18 and 19 illustrate examples of nested HARQ.

More generally, the HARQ nesting method may have a plurality of iterations, as illustrated in FIG. 18. Once an iteration occurs in which all transmitted parity CBs are correctly decoded, which is shown as transmitted parity CBs $P_1^R$ to $P_{N_R}^R$ in FIG. 18, then the correctly decoded parity CBs may be used to correctly decode the failed CBs in the previous iteration, which are then used to correctly decode the failed CBs in the previous iteration, and so on, until the N failed information CBs are correctly decoded.

Each "Encode" block in FIG. 18 may be implemented the same way, just with different inputs, as illustrated. The "Encode" block may perform the outer encoding described earlier, i.e. for each parity CB, perform an XOR of the input CBs or cyclic shifts thereof, e.g. as per Equation 1 or an alternative method satisfying the general principles of Equation 1 discussed earlier.

Each "Decode" block in FIG. 18 may be implemented in the same way, just with different inputs, as illustrated. The "Decode" block may perform the outer decoding method described earlier, e.g. in relation to FIG. 17.

Figure 19:
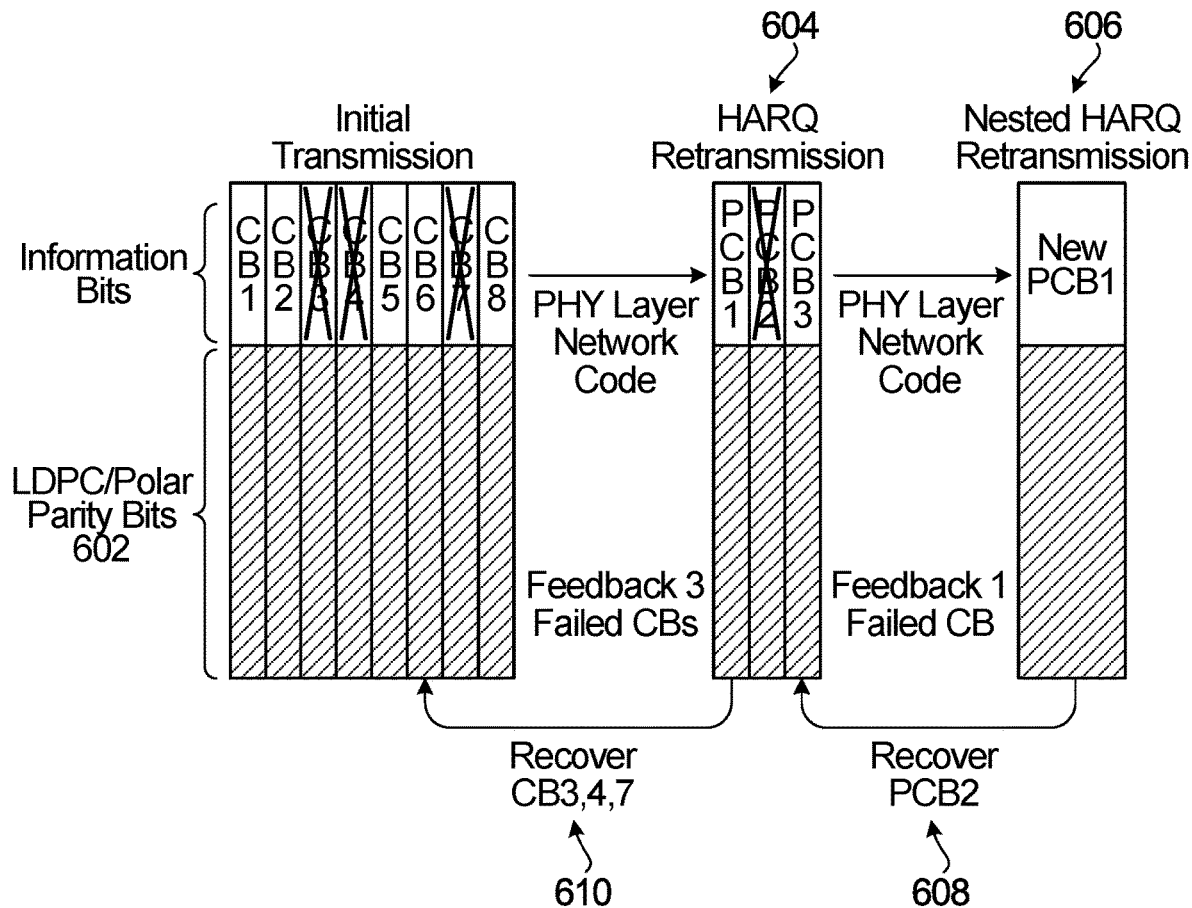

FIG. 19 illustrates an example in which seven information CBs are initially transmitted with an inner code that is either LDPC or Polar code to produce inner code parity bits 602. CBs 3, 4, and 7 fail, and so a HARQ retransmission is sent having three parity CBs, as shown at 604. Parity CB 2 fails, and so a nested HARQ retransmission is sent having another parity CB, as shown at 606. The parity CB sent in the nested HARQ retransmission is correctly decoded and is used to recover the failed parity CB 2, as shown at 608. Recovered parity CB 2, along with parity CBs 1 and 3 are used to recover information CBs 3, 4, and 7, as shown at 610.

In some alternative embodiments, the HARQ method may be "NACK-less", i.e. if decoding of a CB fails then no NACK is sent to the transmitter. A HARQ method may operate as follows: send m information CBs $C_1$ to $C_m$. If no ACK is received after a predetermined time interval, then send one parity CB that is generated from an XOR of the information CBs or cyclic shifts thereof, e.g. the parity CB may be generated as per Equation 1. If no ACK is received after a predetermined time interval following the transmission of the first parity CB, the information CBs are used to generate a second parity CB, which is transmitted to the receiver. If no ACK is received after a predetermined time interval following the transmission of the second parity CB, the information CBs are used to generate a third parity CB, which is transmitted to the receiver, and so on, until the decoder has enough correctly received parity CBs to correctly decode all failed information CBs. In an alternative embodiment, the transmitter may generate and send a predetermined number of parity CBs in a single transmission, instead of sending a single parity CB at each iteration. Each parity CB may be generated as described earlier, i.e. for each parity CB, perform an XOR of the input CBs or cyclic shifts thereof, e.g. as per Equation 1 or an alternative method satisfying the general principles of Equation 1 discussed earlier. The method at the decoder to recover failed information CBs may operate as discussed earlier, e.g. in relation to FIG. 17. In some embodiments, the decoding to recover N failed information CBs may commence once N parity CBs are received and correctly decoded.

Advantages, Additional Variations, and Notes

In some embodiments, the HARQ retransmission method using an outer code, as described herein, has several possible technical improvements and technical advantages. For example, in some prior systems, HARQ retransmission is TB based, which may result in retransmitting correctly decoded CBs in a failed TB. However, in some embodiments herein, the amount of data retransmitted may be reduced because only parity CBs equal in number to the failed CBs need to be retransmitted. Further retransmissions would only be needed if the parity CBs were incorrectly decoded. As another example, in some prior systems, the HARQ feedback may include a CBG index that indicates which CBGs failed. However, in some embodiments herein, the overhead of HARQ feedback may be reduced compared to sending a CBG index because in some embodiments herein the feedback only indicates how many CBs failed, without identifying which specific CBs failed. As another example, in some prior systems, soft combining is used as part of the HARQ process, which may not work well, e.g. in cases where eMBB traffic is pre-empted by URLLC traffic. If eMBB traffic is pre-empted by URLLC traffic, then HARQ soft combining may fail because combining redundant versions of the failed CBs with the CBs that are not intended for it, and hence are interference in this sense, will typically not work. High speed scenarios may cause more TB and/or CB losses that are similar to an erasure channel. The HARQ feedback methods disclosed in some embodiments herein may better accommodate eMBB/URLLC multiplexing and/or high speed scenarios.

In some embodiments above, an outer code design, which may be an erasure code design, is provided for HARQ that is based on cyclic shift of information CBs. In some embodiments, a relatively simple decoding algorithm is provided that does not require complex computations such as matrix inversions, and any N lost code blocks can be decoded using the first successfully decoded N parity CBs. In some embodiments, the erasure code may be applied in a nested HARQ protocol, as described above. The nested HARQ protocol may have applications in NR, such as in URLLC and/or V2X.

Prior systems do disclose other erasure codes, e.g. in the following references:

[1] R1-1608976, "Consideration on Outer Codes for NR", 3GPP TSG-RAN WG1 #86bis, Lisbon, Portugal, 10-14 Oct. 2016.

[2] R1-1610143, "Erasure coding and HARQ design", 3GPP TSG-RAN WG1 #86bis, Lisbon, Portugal, 10-14 Oct. 2016.

[3] R1-166375, "Erasure coding evaluation methodology", 3GPP TSG-RAN WG1 #86 22-26 Aug. 2016 Gothenburg, Sweden.

[4] U.S. Patent Application Publication No. 2018/0159660, filed Sep. 28, 2017, and entitled "Systems and Methods for Outer Coding".

Also, candidate erasure codes have been considered in previous systems, e.g.: (1) single parity check codes, which are only applicable to correcting a single error; (2) Reed-Solomon codes, which have a restriction on code length, and code rate has to be determined in advance, and a shortened Reed-Solomon code is usually less efficient; (3) raptor codes or any type of fountain codes or rateless codes, which at least in the case of raptor codes are more suitable for a large number of CBs, and in which decoding may require extra redundancy packets.

Embodiments disclosed have technical advantages over prior systems. Some of these technical advantages have already been described. Others are as follows. Compared to [4] some embodiments described herein correct more than two failed information CBs. In some embodiments disclosed herein, technical advantages over other erasure codes may include: no redundancy, i.e. N parity CBs correct N failed info CBs withincreased decoding probability; works for any code length, i.e. number of information CBs may be any number; relatively simple decoding algorithm, e.g. no matrix inversion; rate compatible, i.e. same parity CB generation no matter how many information CBs are lost. In some embodiments disclosed herein, technical advantages over CBG-based HARQ may include: retransmission is CB based, not CBG based, which may result in less retransmission; less overhead in HARQ feedback, e.g. only the number of CBs lost needs to be fed back to the transmitter, not the index of the actual failed CB or CBG; possibly better performance compared to traditional soft combining based HARQ, which does not work well for erasure type channels, and many applications in NR may have an erasure type channel, e.g.: pre-emption in eMBB-URLLC multiplexing, bursty interference in grant-free (GF)/non-orthogonal multiple access (NoMA), and high speed scenarios in NR-V2X.

With respect to some embodiments described herein, simulations have been implemented for the general encoding and decoding method, with arbitrary CB length k and arbitrary number of information CBs m. Testing using the encoder and decoder has been performed for any k as a prime number and any integer number m<k. In the testing, Nparity CBs correctly recovered N failed information CBs.

In embodiments described earlier, the code block length k is a prime number. This comes into play in deriving information CB $C_3$ for the defined sequence $D_2$. Otherwise, the method may not be able to execute properly because the same pattern may repeat in the $D_2$ sequence. However, if the number of information code blocks m satisfies m≤k−1, then as long as k is not an integer multiples of 2, 3, . . . , and m−1, the above embodiments should still work. For example, if the decoder only needs to correct up to two information CBs as in [4], if m=2, i.e., only two information code blocks CB1 and CB2 are used, then k can be any positive integer. However, if m=3, i.e., there are three information code blocks CB1, CB2 and CB3, k should be an odd number. In the example where there are three information CBs, then k being an odd number is preferred.

Also, note that when there are only two parity code blocks, as in [4], there may be an ambiguity in the decoding results if relying on the two parity equations alone. If the decoder XORs all information bits with 1, i.e., flipped every information bit, the parity equations would still be valid. This ambiguity creates two candidate values for the failed code blocks. The ambiguity may be resolved by verifying the CRC of each candidate. For the example demonstrated above to correct three information CBs, there may be an ambiguity in decoding the $D_1$ and $D_2$ sequences, and another ambiguity in decoding $C_2$ and $C_3$ from $D_1$ and $D_3$, which means a maximum of four CRC checks for each CB, which is reasonable in terms of complexity for a typical implementation.

In some embodiments, although k being a prime number is preferable, the encoding method may still work for any other choice of k. In some situations, the decoding method may vary a bit for other choices of k values.

An alternative embodiment to the nested HARQ is that, in the example of third transmission of nested HARQ, instead of transmission of a parity CB generated from the P1 to P3, the network device can generate a parity CB of P4 from all the original information CBs.

Also, it will be appreciated that the decoding method herein is just one example of decoding. Other decoding methods may be used for the same outer code. In some embodiments, the information blocks and parity blocks may be transmitted together, and some parity coded blocks may also not be successfully decoded. In this scenario, some variation of the decoding method described in this disclosure may be used.

Figure 20:
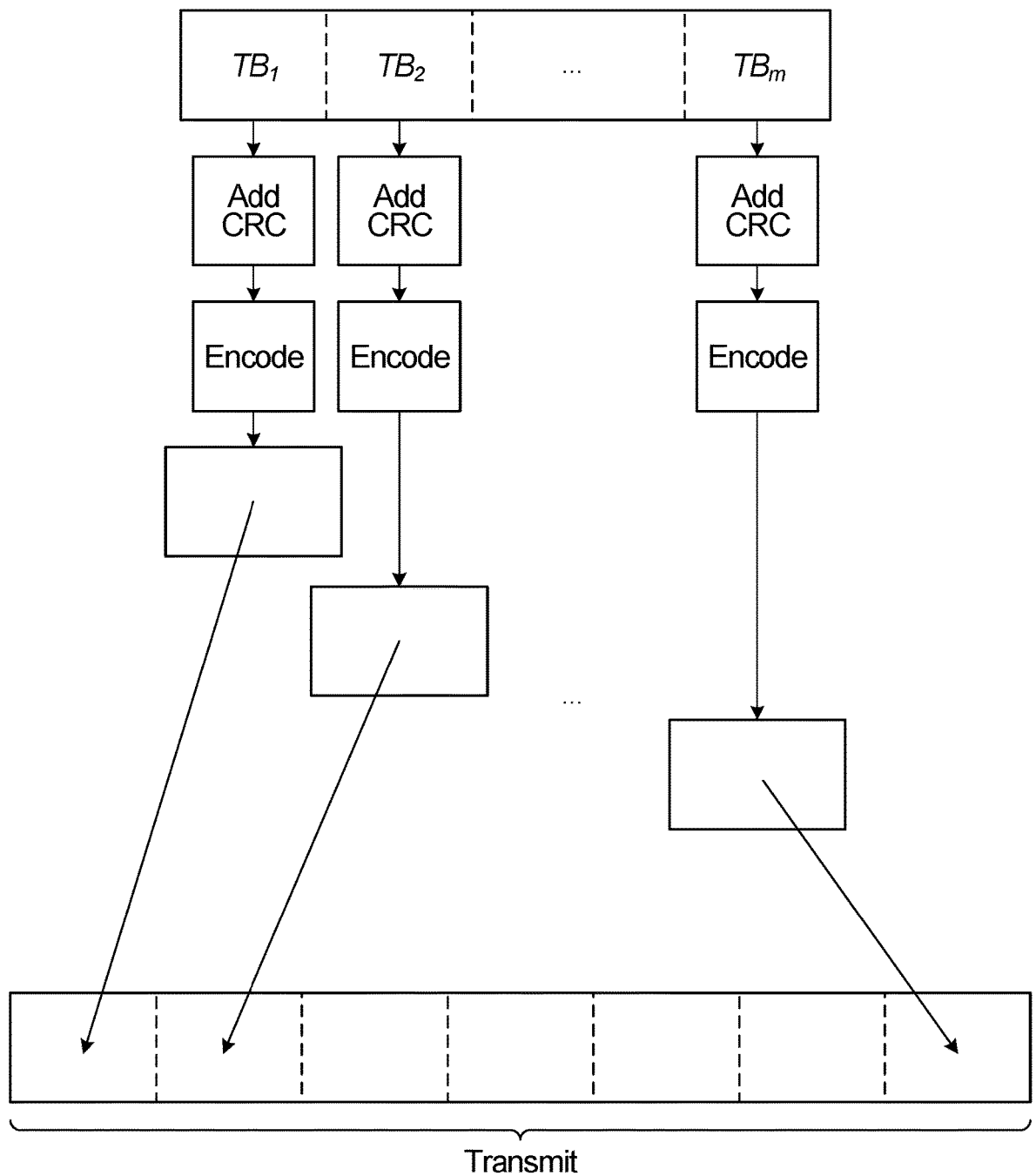
FIG. 20 illustrates embodiments applied to TBs instead of codeblocks.
Figure 21:
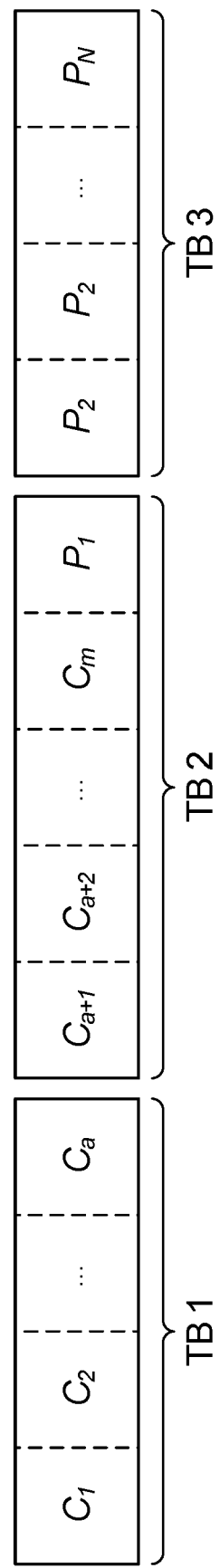
FIG. 21 illustrates an example of information and parity codeblocks for an outer code spread over multiple TBs.

Finally, although the coding design described in embodiments above operates at a CB level, it may be easily extended to CB level with multiple TBs, as well as TB level outer code, e.g. if CB were instead a TB. As one example, FIG. 20 illustrates a plurality of TBs, which are inner encoded and transmitted to the receiving system. Each TB may be considered and called a CB, and outer encoding and the decoding process described herein may be applied, but at a TB level. As another example, FIG. 21 illustrates a plurality of encoded CBs and parity CBs that are transmitted as part of the outer encoding/decoding described herein. The CBs span multiple TBs.

EXAMPLES

In view of, and in addition to the above, the following examples are disclosed.

Example 1: A method performed by a network device, the method comprising: encoding each information block of m information blocks to obtain a respective encoded code block; transmitting the m encoded code blocks; receiving a feedback message indicating a quantity N≤m of failed code blocks, without identifying which ones of the m code blocks were unsuccessfully decoded; computing N parity blocks from the m information blocks by, for each one of the N parity blocks, performing an XOR operation on all of the m information blocks or cyclic shifts thereof; encoding each parity block of the N parity blocks to obtain N encoded parity code blocks; and transmitting the N encoded parity code blocks.

Example 2: The method of Example 1, wherein computing the N parity blocks comprises: for each parity block, computing an XOR of m words, wherein each one of the m words is either equal to or a cyclic shift of a respective different one of the m information blocks.

Example 3: The method of Example 1 or 2, wherein the cyclic shift applied to an information block $C_i$ to compute a parity block $P_j$ is different from the cyclic shift applied to that information block $C_i$ to compute each other parity block $P_{h \neq j}$.

Example 4: The method of any one of Examples 1 to 3, wherein for each parity block $P_j$, 1≤j≤N: the cyclic shift applied to each information block $C_i$, 1≤i≤m to compute parity block $P_j$ is a function of j and i.

Example 5: The method of any one of Examples 1 to 4, wherein for each parity block $P_j$, 1≤j≤N: the cyclic shift applied to each information block $C_i$, 1≤i≤m to compute parity block $P_j$ is based on a function of j multiplied by a function of i.

Example 6: The method of any one of Examples 1 to 5, wherein for each one of the N parity blocks: the cyclic shift applied to each one of the m information blocks, if any, to compute that parity block, is a function of which one of the m information blocks is being cyclically shifted multiplied by which parity block is being computed.

Example 7: The method of any one of Examples 1 to 6, wherein the feedback message is a first feedback message, and wherein the method further comprises: receiving a second feedback message indicating a quantity $N_1$≤N of failed parity blocks, without identifying which ones of the parity blocks were unsuccessfully decoded; computing $N_1$ new parity blocks from the N parity blocks by, for each one of the $N_1$ new parity blocks, performing an XOR operation on all of the N parity blocks or cyclic shifts thereof; encoding each one of the new parity blocks to obtain $N_1$ new encoded parity code blocks; and transmitting the $N_1$ new encoded parity code blocks.

Example 8: The method of any one of Examples 1 to 7, wherein each code block is a transport block.

Example 9: A network device comprising: a memory having processor-executable instructions stored thereon; a processor configured to execute the processor-executable instructions in order to cause the network device to perform the method of any one of Examples 1 to 8.

Example 10: A network device comprising: a transmitter, a receiver, and an encoder; the encoder to: receive bits partitioned into m information blocks, and encode each information block of the m information blocks to obtain m encoded blocks; the transmitter to transmit the m encoded blocks; the receiver to receive a feedback message indicating that decoding of N≤m of the encoded blocks failed; the encoder further to compute N parity blocks from the m information blocks by, for each one of the N parity blocks, performing an XOR of the m information blocks or cyclic shifts thereof; the encoder further to encode each parity block of the N parity blocks to obtain N encoded parity blocks; and the transmitter further to transmit the N encoded parity blocks.

Example 11: A method performed by a network device, the method comprising: receiving m encoded code blocks, each one of the m encoded code blocks corresponding to a respective information block that has been encoded; decoding the m encoded code blocks; in response to decoding failing for N≤m of the encoded code blocks: transmitting feedback indicating a quantity N of failed code blocks, without identifying which ones of the m code blocks were incorrectly decoded; receiving N encoded parity blocks; decoding the N encoded parity blocks to obtain N parity blocks; decoding the N incorrectly decoded information blocks using the N parity blocks.

Example 12: The method of Example 11, wherein decoding the N incorrectly decoded information blocks using the N parity blocks comprises: for each one of the N parity blocks: XORing the parity block with each correctly decoded information block or with a cyclic shifted version of the correctly decoded information block.

Example 13: The method of Example 11 or Example 12, wherein decoding the N incorrectly decoded information blocks using the N parity blocks comprises: recursively calling a decoding function, wherein in each of a plurality of recursions of the decoding function, pairs of input parity blocks are cyclic shifted and XOR'd to remove the effect of one information block.

Example 14: The method of Example 13, wherein the output of one recursion of the decoding function is used to generate the output of another recursion of the decoding function, with the final output being the decoded information blocks.

Example 15: The method of Example 13 or 14, wherein the output of one recursion of the decoding function comprises a code block D, and another codeblock C is determined using D.

Example 16: The method of any one of Examples 11 to 15, wherein the code blocks are TBs.

Example 17: A network device comprising: a memory having processor-executable instructions stored thereon; a processor configured to execute the processor-executable instructions in order to cause the network device to perform the method of any one of Examples 11 to 16.

Example 18: A network device comprising: a transmitter, a receiver, and a decoder; the receiver to receive m encoded blocks, each one of the m encoded blocks corresponding to a respective information block that has been encoded; the decoder to decode the m encoded blocks; in response to decoding failing for N≤m of the encoded blocks: the transmitter to transmit feedback indicating N information blocks have been incorrectly decoded; the receiver to receive N encoded parity blocks; the decoder to decode the N encoded parity blocks to obtain N parity blocks; the decoder further to decode the N incorrectly decoded information blocks using the N parity blocks.

Example 19: A method performed by a network device, the method comprising: encoding each information block of m information blocks to obtain a respective encoded code block; transmitting the m encoded code blocks; computing N parity blocks from the m information blocks by, for each one of the N parity blocks, performing an XOR operation on all of the m information blocks or cyclic shifts thereof, wherein 1<N≤m; encoding each parity block of the N parity blocks to obtain N encoded parity code blocks; and transmitting the N encoded parity code blocks.

Example 20: The method of Example 19, wherein after transmitting the m encoded code blocks, the method further comprises: receiving a feedback message indicating a quantity N of failed code blocks, optionally without identifying which ones of the m encoded code blocks were unsuccessfully decoded.

Example 21: The method of Example 19 or Example 20, wherein computing the N parity blocks comprises: for each parity block, computing an XOR of m words, wherein each one of the m words is either equal to or a cyclic shift of a respective different one of the m information blocks.

Example 22: The method of any one of Examples 19 to 21, wherein the cyclic shift applied to an information block $C_i$ to compute a parity block $P_j$ is different from the cyclic shift applied to that information block $C_i$ to compute each other parity block $P_{h \neq j}$.

Example 23: The method of any one of Examples 19 to 22, wherein for each parity block $P_j$, 1≤j≤N: the cyclic shift applied to each information block $C_i$, 1 <i <m to compute parity block $P_j$ is a function of j and i.

Example 24: The method of any one of Examples 19 to 23, wherein for each parity block $P_j$, 1≤j≤N: the cyclic shift applied to each information block $C_i$, 1≤i≤m to compute parity block $P_j$ is based on a function of j multiplied by a function of i.

Example 25: The method of any one of Examples 19 to 24, wherein the method further comprises: computing $N_1$≤N new parity blocks from the N parity blocks by, for each one of the $N_1$ new parity blocks, performing an XOR operation on all of the N parity blocks or cyclic shifts thereof; encoding each one of the new parity blocks to obtain $N_1$ new encoded parity code blocks; and transmitting the $N_1$ new encoded parity code blocks.

Example 26: The method of Example 25, wherein after transmitting the N encoded parity code blocks, the method further comprises: receiving a feedback message indicating a quantity $N_1$ of failed parity blocks, optionally without identifying which ones of the parity blocks were unsuccessfully decoded.

Example 27: The method of any one of Examples 19 to 26, wherein each code block is a transport block.

Example 28: A network device comprising: a transmitter and an encoder; the encoder to: receive bits partitioned into m information blocks, and encode each information block of the m information blocks to obtain a respective encoded code block; the transmitter to transmit the m encoded code blocks; the encoder further to compute N parity blocks from the m information blocks by, for each one of the N parity blocks, performing an XOR operation on all of the m information blocks or cyclic shifts thereof, wherein $1<N\leq m$; the encoder further to encode each parity block of the N parity blocks to obtain N encoded parity code blocks; and the transmitter further to transmit the N encoded parity code blocks.

Example 29: The network device of Example 28, further comprising a receiver, and wherein upon unsuccessful decoding of N encoded code blocks the receiver is to receive a feedback message indicating a quantity N of failed code blocks, and optionally wherein the feedback message does not identify which ones of the m encoded code blocks were unsuccessfully decoded.

Example 30: The network device of Example 28 or Example 29, wherein the encoder is to compute the N parity blocks by performing operations comprising: for each parity block, computing an XOR of m words, wherein each one of the m words is either equal to or a cyclic shift of a respective different one of the m information blocks.

Example 31: The network device of any one of Examples 28 to 30, wherein the cyclic shift to be applied to an information block $C_i$ to compute a parity block $P_j$ is different from the cyclic shift to be applied to that information block $C_i$ to compute each other parity block $P_{h \neq j}$.

Example 32: The network device of any one of Examples 18 to 31, wherein for each parity block $P_j$, $1 \leq j \leq N$: the cyclic shift to be applied to each information block $C_i$, $1 \leq i \leq m$ to compute parity block $P_j$ is a function of j and i.

Example 33: The network device of any one of Examples 28 to 32, wherein for each parity block $P_j$, $1 \leq j \leq N$: the cyclic shift to be applied to each information block $C_i$, $1 \leq i \leq m$ to compute parity block $P_j$ is based on a function of j multiplied by a function of i.

Example 34: The network device of any one of Examples 28 to 33, wherein the encoder is further to: (i) compute $N_1 \leq N$ new parity blocks from the N parity blocks by, for each one of the $N_1$ new parity blocks, performing an XOR operation on all of the N parity blocks or cyclic shifts thereof; and (ii) encode each one of the new parity blocks to obtain $N_1$ new encoded parity code blocks; and wherein the transmitter is further to transmit the $N_1$ new encoded parity code blocks.

Example 35: The network device of Example 34, wherein after the N encoded parity code blocks have been transmitted, and upon $N_1$ failed parity blocks, the receiver is to receive a feedback message indicating a quantity $N_1$ of failed parity blocks, optionally wherein the feedback message does not identify which ones of the parity blocks were unsuccessfully decoded.

Example 36: The network device of any one of Examples 28 to 35, wherein each code block is a transport block.

Example 37: A method performed by a network device, the method comprising: receiving m encoded code blocks, each one of the m encoded code blocks corresponding to a respective information block that has been encoded; decoding the m encoded code blocks; in response to decoding failing for $N \leq m$ of the encoded code blocks: transmitting feedback indicating a quantity N of failed code blocks, without identifying which ones of the m code blocks were incorrectly decoded; receiving N encoded parity blocks; decoding the N encoded parity blocks to obtain N parity blocks; decoding the N incorrectly decoded information blocks using the N parity blocks.

Example 38: The method of Example 37, wherein decoding the N incorrectly decoded information blocks using the N parity blocks comprises: for each one of the N parity blocks: XORing the parity block with each correctly decoded information block or with a cyclic shifted version of the correctly decoded information block.

Example 39: The method of Example 37 or Example 38, wherein decoding the N incorrectly decoded information blocks using the N parity blocks comprises: recursively calling a decoding function, wherein in each of a plurality of recursions of the decoding function, pairs of input parity blocks are cyclic shifted and XOR'd together.

Example 40: The method of Example 39, wherein the output of one recursion of the decoding function is used to generate the output of another recursion of the decoding function, with the final output being the decoded information blocks.

Example 41: The method of Example 39 or 40, wherein the output of one recursion of the decoding function comprises a code block D, and another codeblock C is determined using D.

Example 42: The method of any one of Examples 37 to 41, wherein the code blocks are transport blocks (TBs).

Example 43: A network device comprising: a memory having processor-executable instructions stored thereon; a processor configured to execute the processor-executable instructions in order to cause the network device to perform the method of any one of Examples 19 to 27 or the method of any one of Examples 37 to 42.

Example 44: A network device comprising: a transmitter, a receiver, and a decoder; the receiver to receive m encoded blocks, each one of the m encoded blocks corresponding to a respective information block that has been encoded; the decoder to decode the m encoded blocks; in response to decoding failing for $N \leq m$ of the encoded blocks: the transmitter to transmit feedback indicating N information blocks have been incorrectly decoded; the receiver to receive N encoded parity blocks; the decoder to decode the N encoded parity blocks to obtain N parity blocks; the decoder further to decode the N incorrectly decoded information blocks using the N parity blocks.

Example 45: The network device of Example 44, wherein the decoder is to decode the N incorrectly decoded information blocks by performing operations comprising for each one of the N parity blocks: XORing the parity block with each correctly decoded information block or with a cyclic shifted version of the correctly decoded information block.

Example 46: The network device of Example 44 or Example 45, wherein the decoder is to decode the N incorrectly decoded information blocks by further performing operations comprising: recursively calling a decoding function, wherein in each of a plurality of recursions of the decoding function, pairs of input parity blocks are cyclic shifted and XOR'd together.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a network device, the method comprising:
   encoding each information block of m information blocks to obtain a respective encoded code block, wherein m>1;
   transmitting the m encoded code blocks;
   computing N parity blocks from the m information blocks, wherein each one of the N parity blocks is generated by an XOR operation of a respective set of m words, wherein each one of the m words is either the same as a respective one of the m information blocks or a result of a cyclic shift of the respective one of the m information blocks, and wherein for at least one of the N parity blocks: at least one of the m words is the result of a cyclic shift of one of the m information blocks, wherein $1<N \leq m$;
   encoding each parity block of the N parity blocks to obtain N encoded parity code blocks; and
   transmitting the N encoded parity code blocks.

2. The method of claim 1, wherein after transmitting the m encoded code blocks, the method further comprises: receiving a feedback message indicating a quantity N of failed code blocks, without identifying which ones of the m encoded code blocks were unsuccessfully decoded.

3. The method of claim 1, wherein the cyclic shift applied to an information block $C_i$, to compute a parity block $P_j$ is different from the cyclic shift applied to the information block $C_i$, to compute each other parity block $P_{h \neq j}$.

4. The method of claim 1, wherein for each parity block $P_j$, $1 \leq j \leq N$: the cyclic shift applied to each information block $C_i$, $1 \leq i \leq m$ to compute parity block $P_j$ is a function of j and i.

5. The method of claim 4, wherein for each parity block $P_j$, $1 \leq j \leq N$: the cyclic shift applied to each information block $C_i$, $1 \leq i \leq m$ to compute parity block $P_j$ is based on a function of j multiplied by a function of i.

6. The method of claim 1, wherein the method further comprises:
   computing $N_1 \leq N$ new parity blocks from the N parity blocks by, for each one of the $N_1$ new parity blocks, performing an XOR operation on all of the N parity blocks or cyclic shifts thereof;
   encoding each one of the new parity blocks to obtain $N_1$ new encoded parity code blocks; and
   transmitting the $N_1$ new encoded parity code blocks.

7. The method of claim 6, wherein after transmitting the N encoded parity code blocks, the method further comprises: receiving a feedback message indicating a quantity $N_1$ of failed parity blocks, without identifying which ones of the parity blocks were unsuccessfully decoded.

8. The method of claim 1, wherein each code block is a transport block.

9. The method of claim 1, wherein each bit of each block of the N parity blocks is the result of the XOR operation on the corresponding bits of the respective set of m words used to generate the block.

10. A network device comprising:
    a transmitter and an encoder;
    the encoder to: receive bits partitioned into m information blocks, and encode each information block of the m information blocks to obtain a respective encoded code block, wherein m>1;
    the transmitter to transmit the m encoded code blocks;
    the encoder further to compute N parity blocks from the m information blocks, wherein each one of the N parity blocks is to be generated by an XOR operation of a respective set of m words, wherein each one of the m words is either the same as a respective one of the m information blocks or a result of a cyclic shift of the respective one of the m information blocks, and wherein for at least one of the N parity blocks: at least one of the m words is the result of a cyclic shift of one of the m information blocks, wherein $1<N \leq m$;
    the encoder further to encode each parity block of the N parity blocks to obtain N encoded parity code blocks; and
    the transmitter further to transmit the N encoded parity code blocks.

11. The network device of claim 10, further comprising a receiver, and wherein upon unsuccessful decoding of N encoded code blocks the receiver is to receive a feedback message indicating a quantity N of failed code blocks, and wherein the feedback message does not identify which ones of the m encoded code blocks were unsuccessfully decoded.

12. The network device of claim 10, wherein the cyclic shift to be applied to an information block $C_i$, to compute a parity block $P_j$ is different from the cyclic shift to be applied to the information block $C_i$, to compute each other parity block $P_{h \neq j}$.

13. The network device of claim 10, wherein for each parity block $P_j$, $1 \leq j \leq N$: the cyclic shift to be applied to each information block $C_i$, $1 \leq i \leq m$ to compute parity block $P_j$ is a function of j and i.

14. The network device of claim 13, wherein for each parity block $P_j$, $1 \leq j \leq N$: the cyclic shift to be applied to each information block $C_i$, $1 \leq i \leq m$ to compute parity block $P_j$ is based on a function of j multiplied by a function of i.

15. The network device of claim 10, wherein the encoder is further to: (i) compute $N_1 \leq N$ new parity blocks from the N parity blocks by, for each one of the $N_1$ new parity blocks, performing an XOR operation on all of the N parity blocks or cyclic shifts thereof; and (ii) encode each one of the new parity blocks to obtain $N_1$ new encoded parity code blocks; and wherein the transmitter is further to transmit the $N_1$ new encoded parity code blocks.

16. The network device of claim 15, wherein after the N encoded parity code blocks have been transmitted, and upon $N_1$ failed parity blocks, the receiver is to receive a feedback message indicating a quantity $N_1$ of failed parity blocks, wherein the feedback message does not identify which ones of the parity blocks were unsuccessfully decoded.

17. The network device of claim 10, wherein each code block is a transport block.

18. The network device of claim 10 wherein each bit of each block of the N parity blocks is the result of the XOR operation on the corresponding bits of the respective set of m words used to generate the block.

19. A method performed by a network device, the method comprising:
    receiving m encoded code blocks, each one of the m encoded code blocks corresponding to a respective information block that has been encoded, wherein m>1;
    decoding the m encoded code blocks;
    in response to the decoding resulting in $N \leq m$ incorrectly decoded information blocks:
        transmitting feedback indicating that there was a quantity N of incorrectly decoded information blocks, without identifying which ones of the m encoded code blocks were incorrectly decoded;
        receiving encoded parity blocks, wherein the number of the encoded parity blocks received equals the quantity N indicated in the feedback;
        decoding the N encoded parity blocks to obtain N parity blocks;
        decoding the N incorrectly decoded information blocks using the N parity blocks.

20. The method of claim 19, wherein decoding the N incorrectly decoded information blocks using the N parity blocks comprises:
    for each one of the N parity blocks: XORing the parity block with each correctly decoded information block or with a cyclic shifted version of the correctly decoded information block.

21. The method of claim 20, wherein decoding the N incorrectly decoded information blocks using the N parity blocks comprises: recursively calling a decoding function, wherein in each of a plurality of recursions of the decoding function, pairs of input parity blocks are cyclic shifted and XOR'd together.

22. A network device comprising:
    a transmitter, a receiver, and a decoder;
    the receiver to receive m encoded blocks, each one of the m encoded blocks corresponding to a respective information block that has been encoded, wherein m>1;
    the decoder to decode the m encoded blocks;
    in response to the decoding resulting in $N \leq m$ incorrectly decoded information blocks:
        the transmitter to transmit feedback indicating that there was a quantity N of incorrectly decoded information blocks, without identifying which ones of the m encoded blocks were incorrectly decoded;
        the receiver to receive encoded parity blocks, wherein the number of the encoded parity blocks received equals the quantity N indicated in the feedback;
        the decoder to decode the N encoded parity blocks to obtain N parity blocks;
        the decoder further to decode the N incorrectly decoded information blocks using the N parity blocks.

23. The network device of claim 22, wherein the decoder is to decode the N incorrectly decoded information blocks by performing operations comprising for each one of the N parity blocks: XORing the parity block with each correctly decoded information block or with a cyclic shifted version of the correctly decoded information block.

24. The network device of claim 23, wherein the decoder is to decode the N incorrectly decoded information blocks by further performing operations comprising: recursively calling a decoding function, wherein in each of a plurality of recursions of the decoding function, pairs of input parity blocks are cyclic shifted and XOR'd together.

* * * * *